US012366112B2

(12) United States Patent
Krantz-Lilienthal et al.

(10) Patent No.: US 12,366,112 B2
(45) Date of Patent: Jul. 22, 2025

(54) CORD LOCK ACTUATION ASSEMBLY FOR A CONTINUOUS LOOPED OPERATOR

(71) Applicant: Springs Window Fashions, LLC, Middleton, WI (US)

(72) Inventors: Eric Nathan Krantz-Lilienthal, Janesville, WI (US); Brian Skotty, Middleton, WI (US)

(73) Assignee: Springs Window Fashions, LLC, Middleton, WI (US)

( * ) Notice: Subject to any disclaimer, the term of this patent is extended or adjusted under 35 U.S.C. 154(b) by 5 days.

(21) Appl. No.: 18/174,218

(22) Filed: Feb. 24, 2023

(65) Prior Publication Data

US 2023/0265713 A1 Aug. 24, 2023

Related U.S. Application Data

(60) Provisional application No. 63/313,593, filed on Feb. 24, 2022.

(51) Int. Cl.
*E06B 9/322* (2006.01)
*E06B 9/262* (2006.01)

(52) U.S. Cl.
CPC .............. *E06B 9/322* (2013.01); *E06B 9/262* (2013.01); *E06B 2009/2625* (2013.01)

(58) Field of Classification Search
CPC . E06B 9/326; E06B 9/78; E06B 9/322; E06B 9/262; E06B 2009/785; E06B 2009/3222; E06B 2009/2625
See application file for complete search history.

(56) References Cited

U.S. PATENT DOCUMENTS

| | | | |
|---|---|---|---|
| 3,123,182 A | 3/1964 | Malone et al. | |
| 4,813,469 A | 3/1989 | Scott | |
| 5,595,232 A | 1/1997 | Benthin | |
| 5,671,793 A * | 9/1997 | Lee | E06B 9/322 160/168.1 R |
| 6,189,595 B1 * | 2/2001 | Lee | E06B 9/303 160/173 R |

(Continued)

FOREIGN PATENT DOCUMENTS

| | | |
|---|---|---|
| CA | 2201209 A1 | 9/1998 |
| CA | 2785483 A1 | 6/2012 |

(Continued)

OTHER PUBLICATIONS

International Search Report and Written Opinion for Application No. PCT/US2023/063232 dated Jun. 23, 2023 (13 pages).

*Primary Examiner* — Johnnie A. Shablack
(74) *Attorney, Agent, or Firm* — Michael Best & Friedrich LLP

(57) ABSTRACT

An actuation assembly for a continuous looped operator includes a slide assembly configured to laterally slide in a first direction and a second direction opposite the first direction, a first cord engagement member carried by the slide assembly, a second cord engagement member carried by the slide assembly, and a selector switch connected to the slide assembly, the selector switch receives a portion of the first cord engagement member and a portion of the second cord engagement member, the selector switch configured to move relative to the slide assembly between a first position and a second position.

29 Claims, 19 Drawing Sheets

(56) References Cited

U.S. PATENT DOCUMENTS

| | | | | |
|---|---|---|---|---|
| 6,196,293 | B1 * | 3/2001 | Lee | E06B 9/303 160/168.1 V |
| 6,516,860 | B1 * | 2/2003 | Weaver | E06B 9/30 160/168.1 R |
| 6,792,995 | B2 | 9/2004 | Judkins | |
| 8,286,686 | B2 | 10/2012 | Cannaverde | |
| 8,540,006 | B1 | 9/2013 | Vestal | |
| 8,544,525 | B2 * | 10/2013 | Zhu | E06B 9/56 160/321 |
| 8,695,680 | B2 | 4/2014 | Cannaverde | |
| 8,763,675 | B2 * | 7/2014 | Zhu | E06B 9/324 160/321 |
| 8,931,538 | B2 * | 1/2015 | Ho | E06B 9/326 160/168.1 R |
| 8,950,463 | B2 | 2/2015 | Vestal et al. | |
| 8,967,226 | B2 | 3/2015 | Vestal | |
| 9,045,934 | B1 | 6/2015 | Lynch et al. | |
| 9,149,143 | B2 | 10/2015 | Vestal | |
| 9,151,110 | B2 | 10/2015 | Vestal et al. | |
| 10,208,535 | B2 | 2/2019 | Marocco | |
| 11,098,528 | B2 | 8/2021 | Smith et al. | |
| 11,105,149 | B2 | 8/2021 | Marocco | |
| 11,142,945 | B2 | 10/2021 | Marocco | |
| 11,236,456 | B2 | 2/2022 | Kang et al. | |
| 11,236,547 | B2 | 2/2022 | Graham et al. | |
| 11,913,280 | B2 * | 2/2024 | Lynch | E06B 9/322 |
| 2003/0201076 | A1 | 10/2003 | Nien | |
| 2015/0007674 | A1 | 1/2015 | Gramsch et al. | |
| 2018/0155982 | A1 | 6/2018 | Medikayala | |
| 2019/0169929 | A1 | 6/2019 | Zhang | |
| 2019/0195014 | A1 * | 6/2019 | Chua | E06B 9/326 |
| 2019/0264501 | A1 | 8/2019 | Marocco | |
| 2019/0264503 | A1 | 8/2019 | Marocco | |
| 2019/0390513 | A1 | 12/2019 | Marocco | |
| 2020/0032582 | A1 | 1/2020 | Graham et al. | |
| 2023/0057794 | A1 * | 2/2023 | Marocco | E06B 9/78 |
| 2023/0228147 | A1 * | 7/2023 | Derk, Jr. | E06B 9/42 160/321 |
| 2023/0235626 | A1 * | 7/2023 | Barkun | E06B 9/322 24/116 R |
| 2024/0003186 | A1 * | 1/2024 | Lu | E06B 9/42 |
| 2024/0271485 | A1 * | 8/2024 | Guerra | E06B 9/326 |

FOREIGN PATENT DOCUMENTS

| | | | | |
|---|---|---|---|---|
| CA | 2834098 | A1 | 11/2012 | |
| CA | 2834099 | A1 | 11/2012 | |
| CA | 2815134 | A1 | 11/2013 | |
| CA | 2953344 | A1 | 12/2015 | |
| CA | 2980064 | A1 | 12/2017 | |
| CA | 2959784 | A1 | 6/2018 | |
| CA | 3106317 | A1 | 1/2020 | |
| CN | 110130819 | A * | 8/2019 | E06B 9/78 |
| EP | 3122984 | B1 | 4/2018 | |
| WO | 2015172754 | A1 | 11/2015 | |

* cited by examiner

CORD LOCK ACTUATION ASSEMBLY FOR A CONTINUOUS LOOPED OPERATOR

CROSS-REFERENCE TO RELATED APPLICATIONS

This application claims priority to U.S. Provisional Patent Application No. 63/313,593, entitled "CORD LOCK ACTUATION ASSEMBLY FOR A CONTINUOUS LOOPED OPERATOR" and filed on Feb. 24, 2022, the entire contents of which is hereby incorporated by reference in its entirety.

FIELD

The present disclosure relates to an assembly for selectively actuating a continuous looped operator. More specifically, the disclosure relates to a cord lock actuation assembly that is configured to selectively actuate a continuous looped operator associated with a window blind in opposing directions. The cord lock actuation assembly advantageously shields the continuous looped operator during use and nonuse, limiting exposure of the continuous looped operator and reducing risk of entanglement and/or accidental strangulation for children or pets.

SUMMARY

In one example of an embodiment, the disclosure provides an actuation assembly for a continuous looped operator includes a slide assembly configured to laterally slide in a first direction and a second direction opposite the first direction, a first cord engagement member carried by the slide assembly, a second cord engagement member carried by the slide assembly, and a selector switch connected to the slide assembly, the selector switch receives a portion of the first cord engagement member and a portion of the second cord engagement member, the selector switch configured to move relative to the slide assembly between a first position and a second position.

In another example of an embodiment, the disclosure provides that in response to the selector switch being moved to the first position and in response to the slide assembly laterally sliding in the first direction, the first cord engagement member is restricted from moving relative to the slide assembly and the second cord engagement member moves relative to the slide assembly to a first position.

In another example of an embodiment, the disclosure provides that in response to the selector switch being moved to the first position and in response to the slide assembly laterally sliding in the second direction, the first cord engagement member is restricted from moving relative to the slide assembly and the second cord engagement member moves relative to the slide assembly to a second position to engage a first portion of the continuous looped operator such that the first portion of the continuous looper operator travels with the slide assembly in the second direction.

In yet another example of an embodiment, the disclosure provides that in response to the selector switch being moved to the second position and in response to the slide assembly laterally sliding in the first direction, the second cord engagement member is restricted from moving relative to the slide assembly and the first cord engagement member moves relative to the slide assembly to a first position.

In yet another example of an embodiment, the disclosure provides that in response to the selector switch being moved to the second position and in response to the slide assembly laterally sliding in the second direction, the second cord engagement member is restricted from moving relative to the slide assembly and the first cord engagement member moves relative to the slide assembly to a second position to engage a second portion of the continuous looped operator such that the second portion of the continuous looper operator travels with the slide assembly in the second direction.

In yet another example of an embodiment, the disclosure provides that the first portion of the continuous looped operator is a first side of the continuous looped operator, and the second portion of the continuous looped operator is a second side of the continuous looped operator.

In yet another example of an embodiment, the disclosure provides that the slide assembly includes an inner housing, the first cord engagement member is configured to selectively slide relative to the inner housing, and the second cord engagement member is configured to selectively slide relative to the inner housing.

In yet another example of an embodiment, the disclosure provides that the inner housing defines a first elongated aperture and a second elongated aperture, a portion of the first cord engagement member is received by the first elongated aperture and a portion of the second cord engagement member is received by the second elongated aperture.

In yet another example of an embodiment, the disclosure provides that the first elongated aperture is offset from the second elongated aperture in at least one direction. In additional embodiments, the first elongated aperture is offset from the second elongated aperture in two directions.

In yet another example of an embodiment, the disclosure provides that the portion of the first cord engagement member is configured to selectively slide relative to the inner housing within the first elongated aperture, and the second cord engagement member is configured to selectively slide relative to the inner housing within the second elongated aperture.

In yet another example of an embodiment, the disclosure provides that the selector switch is rotatably connected to the slide assembly, the selector switch is configured to rotate relative to the slide assembly between the first position and the second position.

In yet another example of an embodiment, the disclosure provides that the slide assembly defines an arcuate aperture, and the selector switch defines a projection, the projection slides within the arcuate aperture in response to the selector switch moving between the first position and the second position.

In yet another example of an embodiment, the disclosure provides that the selector switch defines a first recess and a second recess, the first recess includes a first narrow end and a first wide end, and the second recess includes a second narrow end and a second wide end, wherein the portion of the first cord engagement member is received by the first recess, and the portion of the second cord engagement member is received by the second recess.

In yet another example of an embodiment, the disclosure provides that in response to the selector switch being moved to the first position, the portion of the first cord engagement member is positioned in the first narrow end of the first recess, and the portion of the second cord engagement member is positioned in the second wide end of the second recess.

In yet another example of an embodiment, the disclosure provides that the first cord engagement member includes a shaft and a plurality of teeth. The teeth can extend radially from the shaft.

In yet another example of an embodiment, the disclosure provides that the second cord engagement member includes a shaft and a plurality of teeth. The teeth can extend radially from the shaft.

In yet another example of an embodiment, the disclosure provides that the first cord engagement member and the second cord engagement member are each spur gears.

In yet another example of an embodiment, the disclosure provides that the first cord engagement member includes a shaft and a plurality of teeth. The teeth can extend radially from the shaft.

In yet another example of an embodiment, the disclosure provides that the selector switch defines a first recess and a second recess, the first recess includes a first narrow end and a first wide end, and the second recess includes a second narrow end and a second wide end, wherein the portion of the first cord engagement member is received by the first recess, and the portion of the second cord engagement member is received by the second recess.

In yet another example of an embodiment, the disclosure provides that in response to the selector switch being moved to the first position, the portion of the first cord engagement member is positioned in the first narrow end of the first recess, and the portion of the second cord engagement member is positioned in the second wide end of the second recess.

In yet another example of an embodiment, the disclosure provides that in response to the selector switch being moved to the second position, the portion of the first cord engagement member is positioned in the first wide end of the first recess, and the portion of the second cord engagement member is positioned in the second narrow end of the second recess.

In yet another example of an embodiment, the disclosure provides a rail assembly defining a first channel, a second channel, and a third channel, a first side of the continuous looped operator is received by the first channel, and a second side of the continuous looped operator is received by the second channel.

In yet another example of an embodiment, the disclosure provides that the slide assembly includes an inner housing, the inner housing is received by the third channel and is configured to slide relative to the rail member.

In yet another example of an embodiment, the disclosure provides that the inner housing includes a first looped operator engagement surface and a second looped operator engagement surface, the first side of the continuous looped operator extends between the first looped operator engagement surface and the first cord engagement member, and the second side of the continuous looped operator extends between the second looped operator engagement surface and the second cord engagement member.

In yet another example of an embodiment, the disclosure provides that the inner housing includes a wall configured to separate a first side channel within the inner housing from a second side channel within the inner housing, the first side of the continuous looped operator extends through the first side channel of the inner housing, and the second side of the continuous looped operator extends through the second side channel of the inner housing.

In yet another example of an embodiment, the disclosure provides that the wall defines the first looped operator engagement surface and the second looped operator engagement surface, and wherein in response to the selector switch being moved to the first position and in response to the slide assembly laterally sliding in the second direction, the second cord engagement member moves relative to the slide assembly to a second position to engage the first portion of the continuous looped operator, trapping the first portion of the continuous looped operator between the second cord engagement member and the second looped operator engagement surface.

Other aspects of the invention will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and being practiced or being carried out in various ways. Also, it is to be understood that the phraseology and terminology used herein is for the purpose of description and should not be regarded as limiting. Terms of degree, such as “substantially,” “about,” “approximately,” etc. are understood by those of ordinary skill to refer to reasonable ranges outside of the given value, for example, general tolerances associated with manufacturing, assembly, and use of the described embodiments.

Figure 1:
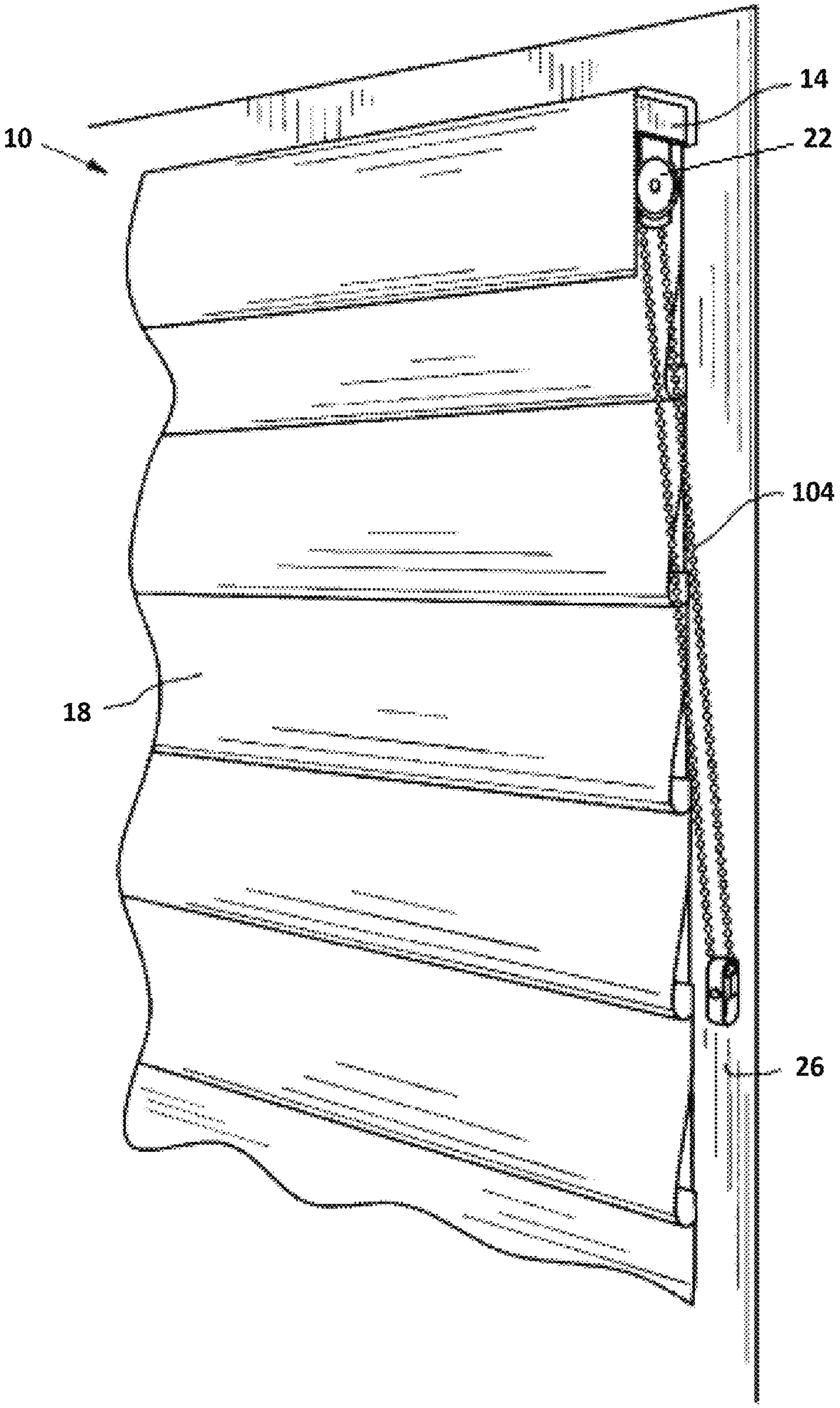
FIG. 1 is a perspective view of an example of an embodiment of a window covering that is known in the art.

With reference now to FIG. 1, an example of an embodiment of a window covering 10 is illustrated. The window covering 10 includes a headrail 14, a window shade panel 18, a drive assembly 22, and a continuous looped operator 104. The headrail 14 is configured to be mounted to a surface 26 surrounding an architectural opening (not shown), such as a window. As a nonlimiting example, the surface 26 can be a window frame, a wall, or other structure surrounding the architectural opening. The drive assembly 22 is configured to be operated by the continuous looped operator 104. More specifically, the continuous looped operator 104 is configured to engage a drive assembly 22. The drive assembly 22 is configured to rotate in response to lateral movement of the continuous looped operator 104. The drive assembly 22 is configured to translate lateral movement of the continuous looped operator 104 into rotational movement of an associated operating system (not shown) positioned in the headrail 14 to raise and/or lower the window shade 18. The drive assembly 22 and associated operating system is generally known in the art and can include a drive roller or drive shaft (not shown) that is configured to rotate in response to actuation of the continuous looped operator 104. In addition, the drive assembly can include a clutch (not shown) or other suitable components to facilitate rotation of the drive roller or drive shaft.

In the illustrated embodiment, the continuous looped operator 104 is illustrated as a bead chain. In other examples of embodiments, the continuous looped operator 104 can be any suitable looped device configured to actuate the window shade panel 18, such as a braided continuous cord loop, a cord, or any other suitable looped structure. In addition, while the window shade panel 18 is illustrated as a roman shade, it should be appreciated that this is for purposes of illustration. The window shade panel 18 (also referred to as a window shade 18) can be any suitable window shade, window covering, window blind, window shade panel, or covering for an architectural opening configured for selective operation by the continuous looped operator 104. The window shade can include, but is not limited to, a roller shade, a cellular shade, a solar shade, a roman shade, a sheer shade, etc.

Figure 2:
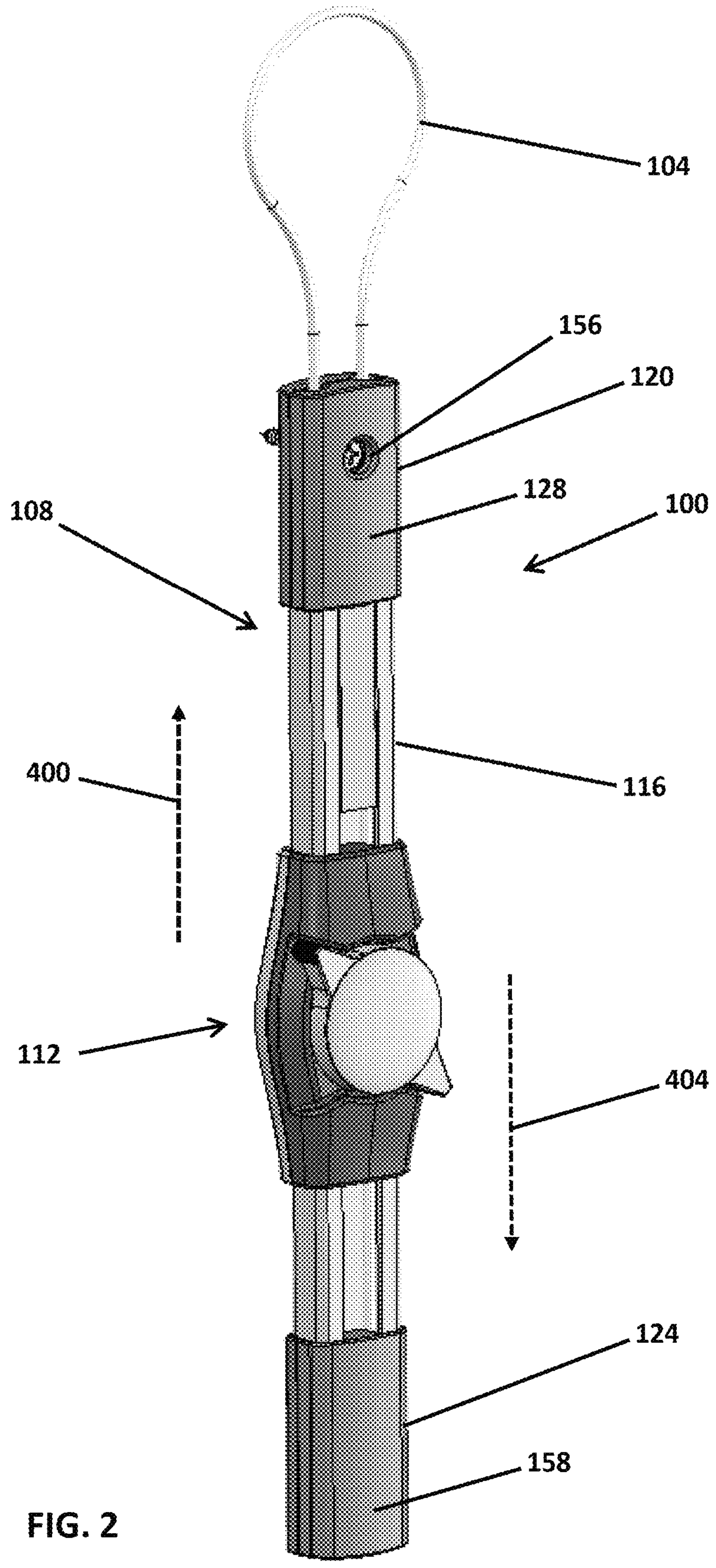
FIG. 2 is a front perspective view of an example of an embodiment of a cord lock actuation assembly operably attached to a continuous looped operator.

With reference now to FIG. 2, an example of a cord lock actuation assembly 100 (also referred to as a cord actuation assembly 100 or an actuation assembly for a continuous looped operator 100 or an actuation assembly 100) is provided. The cord lock actuation assembly 100 is configured to be in operable engagement with the continuous looped operator 104 (also referred to as a continuous-loop lift 104 or a cord loop 104). More specifically, the cord lock actuation assembly 100 is configured to receive the continuous looped operator 104. Further, the cord lock actuation assembly 100 is configured to selectively engage a portion of the continuous looped operator 104 and further selectively operate the continuous looped operator 104 to raise and/or lower the window shade panel 18 (shown in FIG. 1). The cord lock actuation assembly 100 advantageously operates the continuous looped operator 104 in an enclosed rail assembly to minimize exposure of the continuous looped operator 104.

Figure 3:
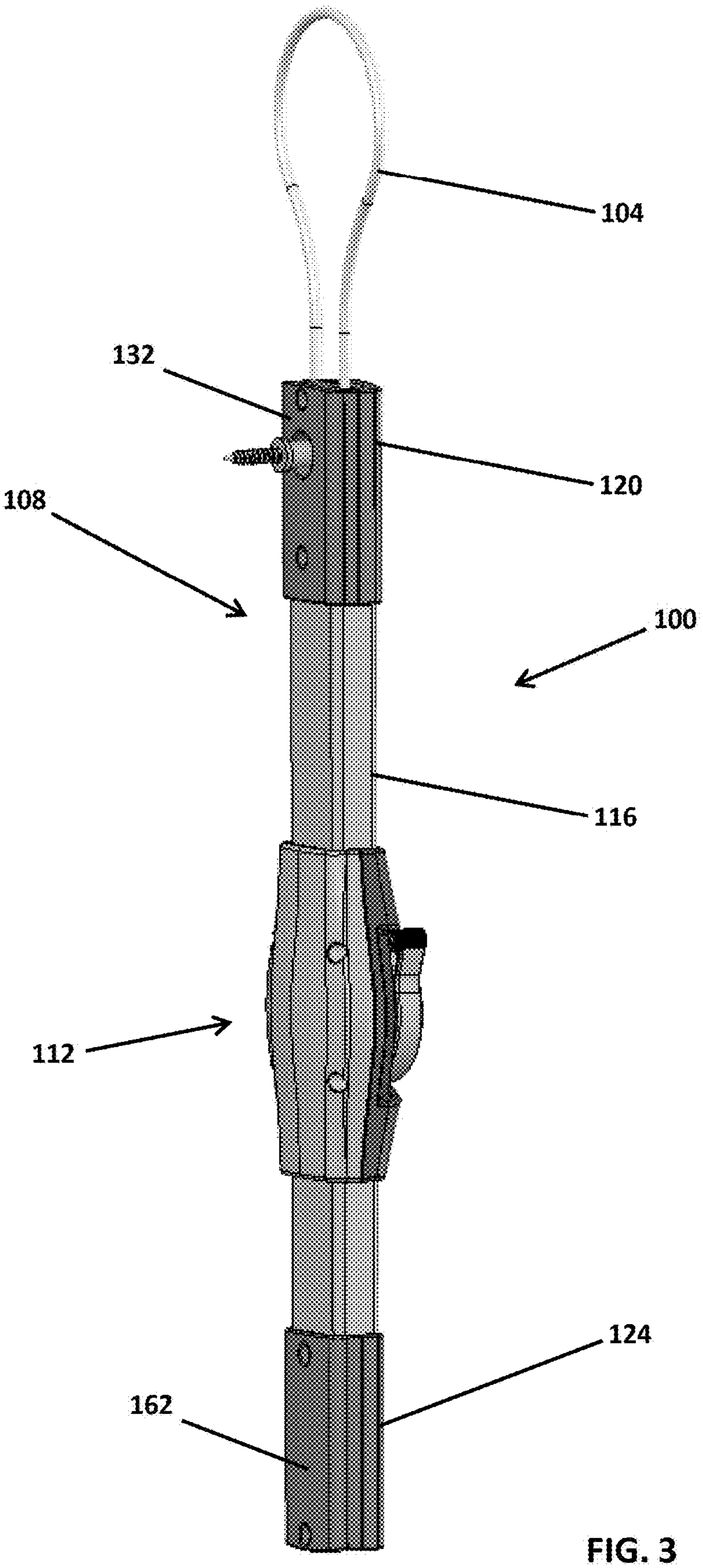
FIG. 3 is a rear perspective view of the cord lock actuation assembly of FIG. 2.

Referring now to FIGS. 2-3, the cord lock actuation assembly 100 is operably connected to the continuous looped operator 104. In this embodiment, the continuous looped operator 104 is depicted as a braided continuous cord loop. The cord lock actuation assembly 100 includes a rail assembly 108 and a slide assembly 112. The slide assembly 112 is configured to slide relative to the rail assembly 108. More specifically, the slide assembly 112 is configured to slide along the rail assembly 108 in a direction of travel defined by the rail assembly 108. The slide assembly 112 is also configured to selectively engage one side of two opposing sides of the continuous looped operator 104.

The rail assembly 108 includes a rail member 116, a first end housing 120, and a second end housing 124. The first end housing 120 (or upper housing 120) is positioned at a first end of the rail member 116, and the second end housing 124 (or lower housing 124) is positioned at a second end of the rail member 116 opposite the first end.

The first end housing 120 includes a first housing member 128 (or a front housing member 128) (shown in FIG. 2) and a second housing member 132 (or a rear housing member 132) (shown in FIG. 3). The first and second housing members 128, 132 are fastened together by at least one fastener 134 (e.g., a screw, bolt, etc.) (shown in FIG. 5). The second housing member 132 is configured to engage the rail member 116.

Figure 4:
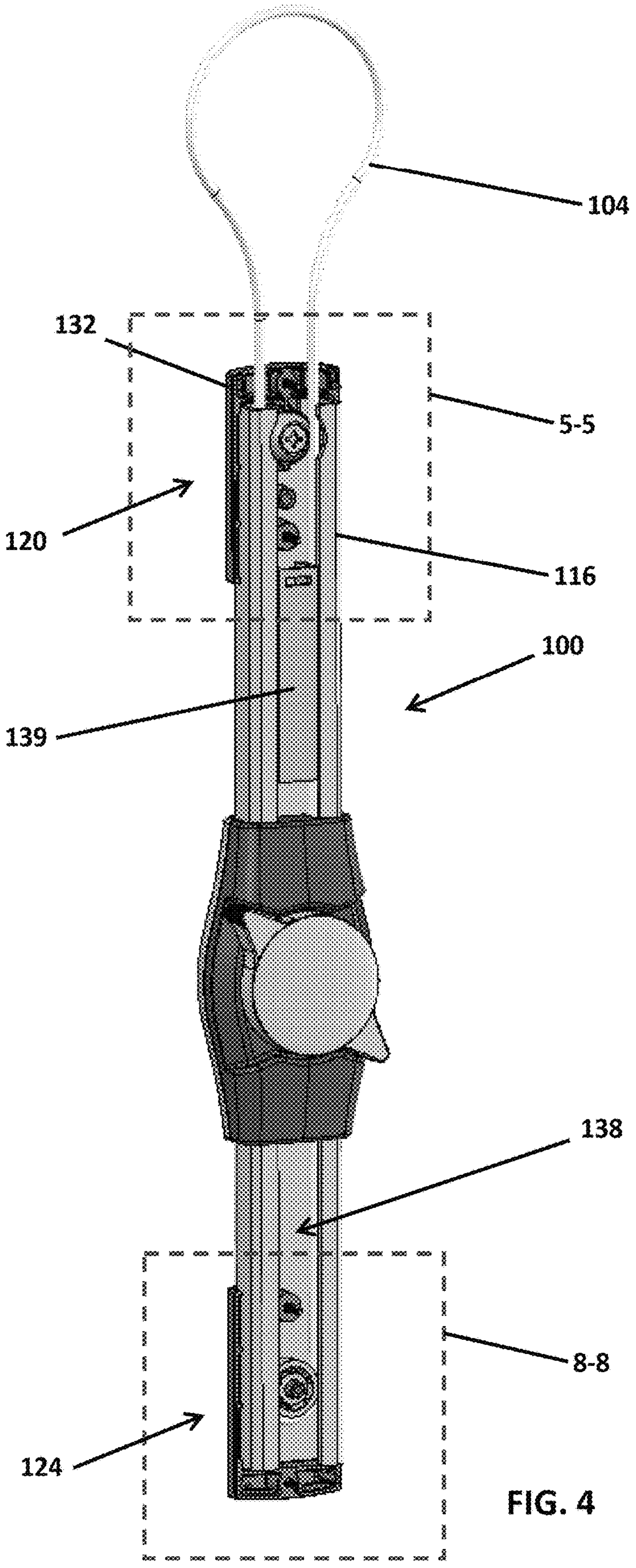
FIG. 4 is a front perspective view of the cord lock actuation assembly of FIG. 2 with a front housing member of the first end housing and a front housing member of a second end housings removed.
Figure 5:
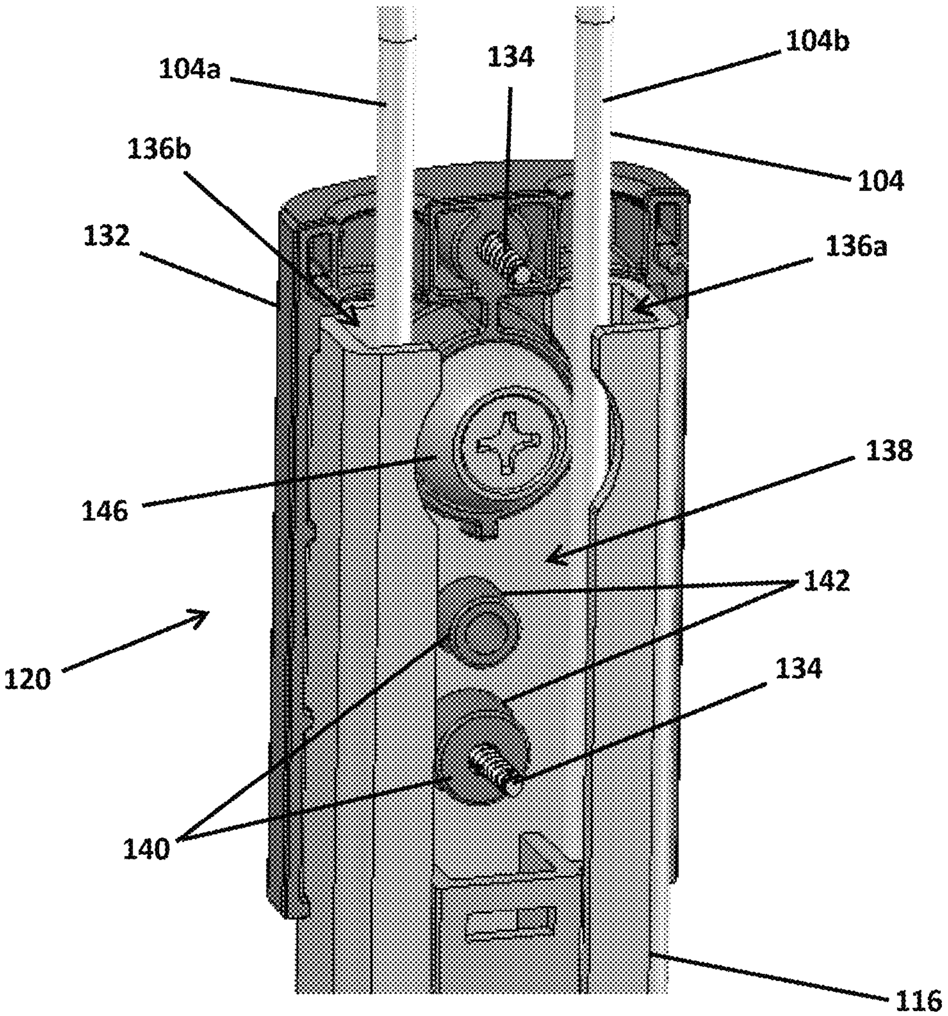
FIG. 5 is an enhanced perspective view of the first end housing of the cord lock actuation assembly of FIG. 2, taken along line 5-5 of FIG. 4 and illustrating the front housing member removed.

As best shown in FIG. 5, the rail member 116 defines two opposing channels 136*a*, 136*b*. A first channel 136*a* receives a first side 104*a* of the continuous looped operator 104. A second channel 136*b* receives a second side 104*b* of the continuous looped operator 104. Each channel 136*a*, 136*b* defines a generally U-shaped channel portion. Thus, the rail member 116 is enclosed on three sides, and partially enclosed on a fourth side. As shown in FIG. 4, the rail member 116 defines an elongated channel 138 (also referred to as a third channel 138) positioned on the fourth side. The elongated channel 138 extends an entire length of the rail member 116. However, in other examples of embodiments, the elongated channel 138 can extend along a portion of the rail member 116. The elongated channel 138 can includes a filler member 139. The filler member 139 can be received by a portion of the rail member 116 to limit access to the continuous looped operator 104 through the elongated channel 138. As such, a portion of the elongated channel 138 can be covered by the filler member 139. In various embodiments, the filler member 139 can be optional, and further can be of various lengths and/or sizes.

Figure 7:
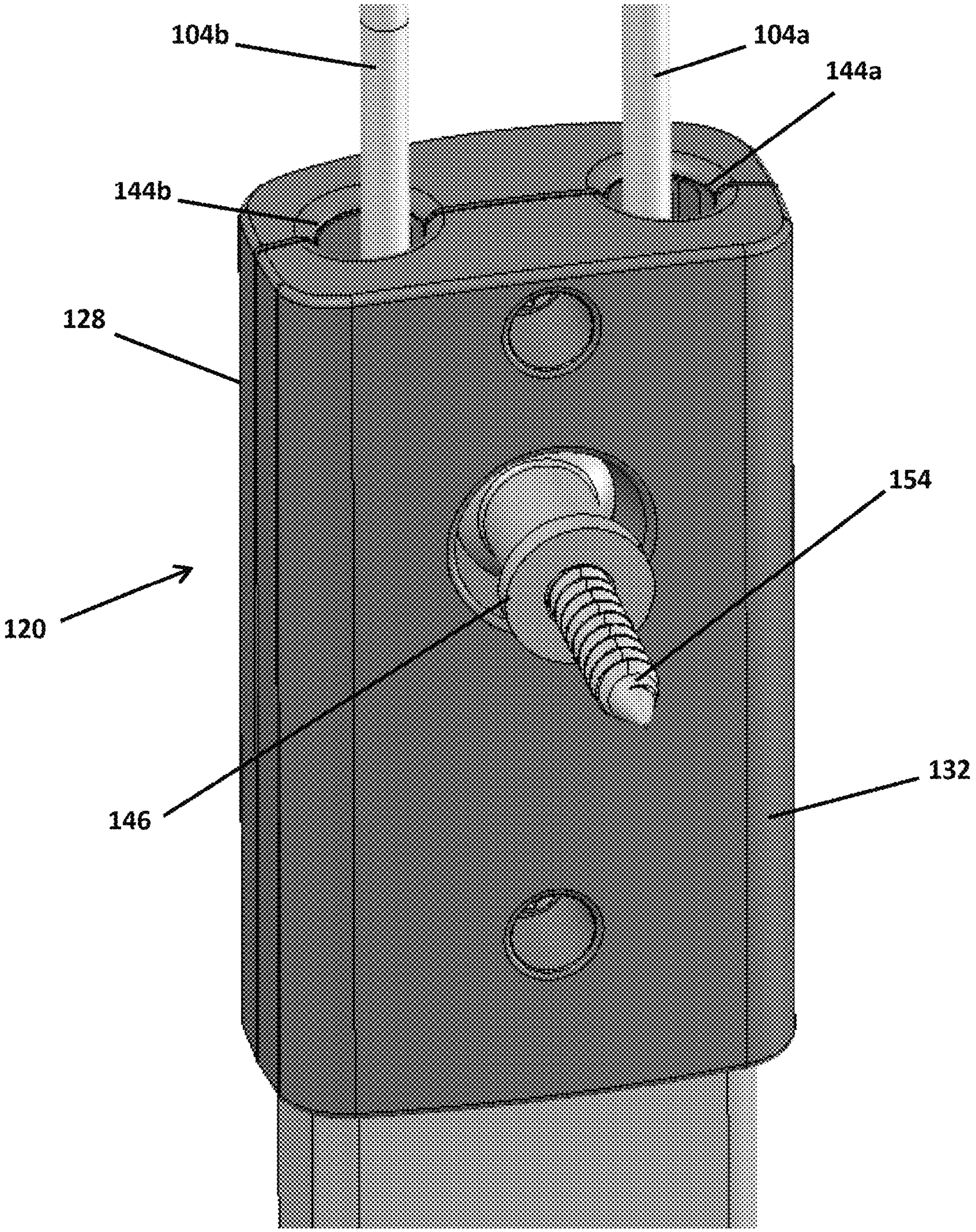
FIG. 7 is a rear perspective view of the first end housing of the cord lock actuation assembly of FIG. 2.

With continued reference to FIG. 5, the first end housing 120 is configured to engage the rail member 116. More specifically, the rear housing member 132 of the first end housing 120 includes at least one projection 140. In the illustrated embodiment, the rear housing member 132 includes a plurality of protections 140. Each projection 140 is received by a corresponding aperture 142 defined by the rail member 116, engaging the rear housing member 132 to the rail member 116. The front housing member 128 (shown in FIG. 2) is then configured to fasten to the rear housing member 132. The first end housing 120 is configured to enclose the first end of the rail member 116, but for apertures 144*a, b* (shown in FIG. 7) defined by the first end housing 120. A first aperture 144*a* receives the first side 104*a* of the continuous looped operator 104, while a second aperture

144*b* receives the second side 104*b* of the continuous looped operator 104. Each aperture 144*a*, 144*b* allows the associated side 104*a*, 104*b* of the continuous looped operator 104 to enter and/or exit the rail assembly 108 in response to actuation (or sliding movement) of the slide assembly 112 relative to the rail assembly 108.

Figure 6:
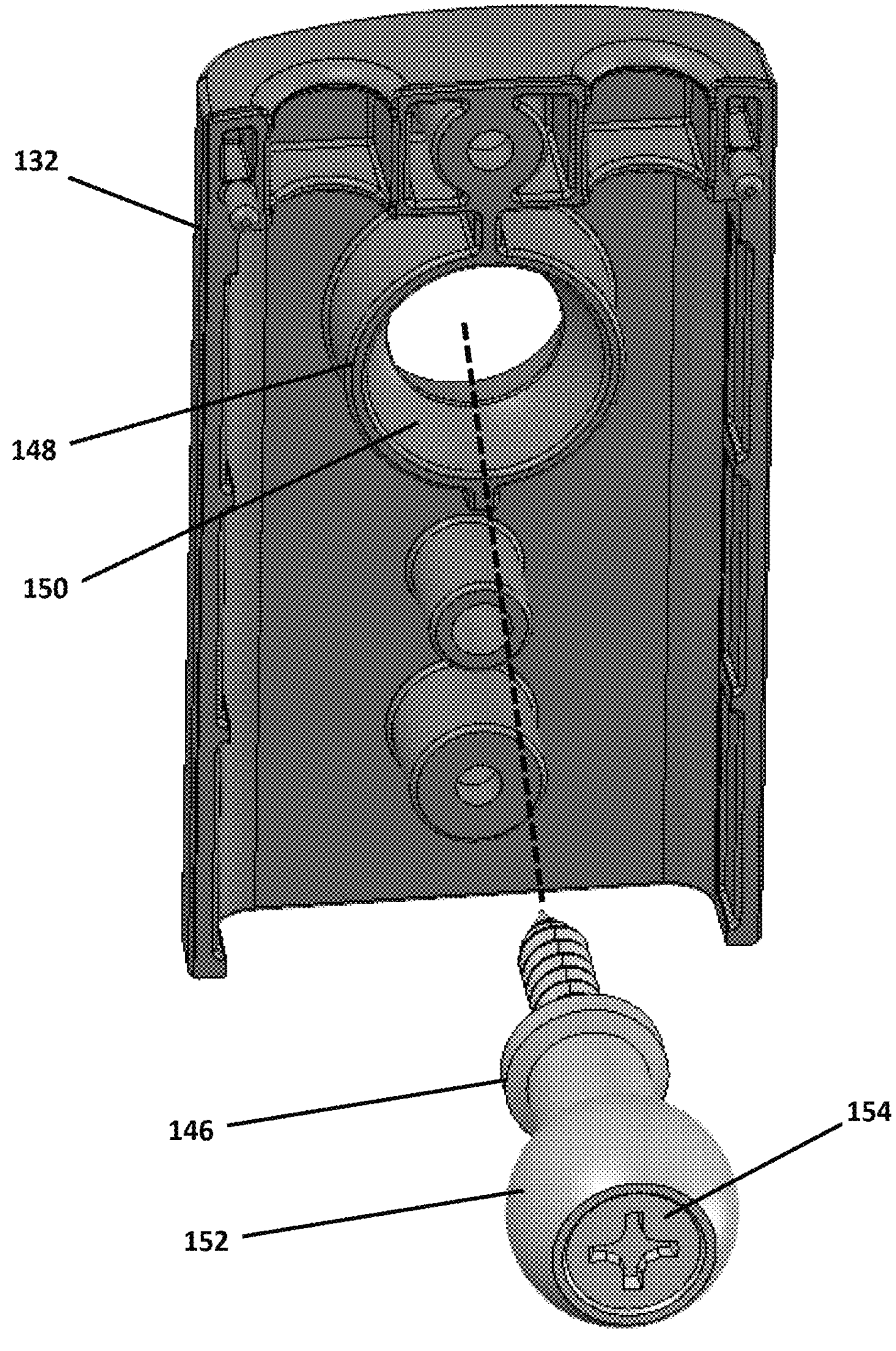
FIG. 6 is a perspective view of a rear housing member of the first end housing of FIG. 5, shown detached from the rail member and with a pivot pin withdrawn from a socket aperture defined by the rear housing member.

The first end housing 120 is configured to be fastened to a support structure (not shown), such as a wall, a trim of a window or architectural opening, or any other structure proximate the window shade and/or window. The first end housing 120 is also configured to pivot relative to the fastener, allowing for limited movement of the cord lock actuation assembly 100 relative to the support structure to which it is fastened. To facilitate this attachment and pivotal movement, the first end housing 120 is configured to receive a pivot pin 146. With reference to FIG. 6, the pivot pin 146 is configured to be received by an aperture 148 defined by the rear housing member 132. The aperture 148 defines an arcuate sloped socket surface 150 (or a socket aperture 150) that is configured to engage a ball 152 defined by the pivot pin 146. Thus, the pivot pin 146 and the aperture 148 define a ball and socket engagement, with the arcuate sloped socket surface 150 being configured to pivot (or rotate) relative to the ball 152 of the pivot pin 146. The pivot pin 146 also receives a fastener 154. The fastener 154 is configured to fasten the pivot pin 146 to the support structure. Thus, the pivot pin 146 and the fastener 154 partially extend through the aperture 148 (shown in FIG. 7). While the rear housing member 132 of the first end housing 120 is configured to pivotally engage to the pivot pin 146, it should be appreciated that the pivot pin 146 and the fastener 154 do not engage the front housing member 128 of the first end housing 120. This non-engagement is to allow for pivotal movement of the first end housing 120 relative to the pivot pin 146. Accordingly, an end of the pivot pin 146 and the fastener 154 are trapped between the front housing member 128 and the rear housing member 132, but the front housing member 128 is not in engagement with the pivot pin 146 or the fastener 154 to facilitate pivoting movement of the first end housing 120 relative to the pivot pin 146. The front housing member 128 does define an aperture 156 through which the fastener 154 can be inserted into engagement with the pivot pin 146 (shown in FIG. 2). However, the aperture 156 simply provides access to the pivot pin 146 (or a point of insertion for the fastener 154 into engagement with the pivot pin 146). The fastener 154 does not engage, contact, or extend through the front housing member 128 in response to engagement with the pivot pin 146.

The second end housing 124 includes a first housing member 158 (or a front housing member 158) (shown in FIG. 2) and a second housing member 162 (or a rear housing member 162) (shown in FIG. 3). The first and second housing members 158, 162 are fastened together by at least one fastener 164 (e.g., a screw, bolt, etc.) (shown in FIG. 8). The second housing member 162 is configured to engage the rail member 116.

Figure 8:
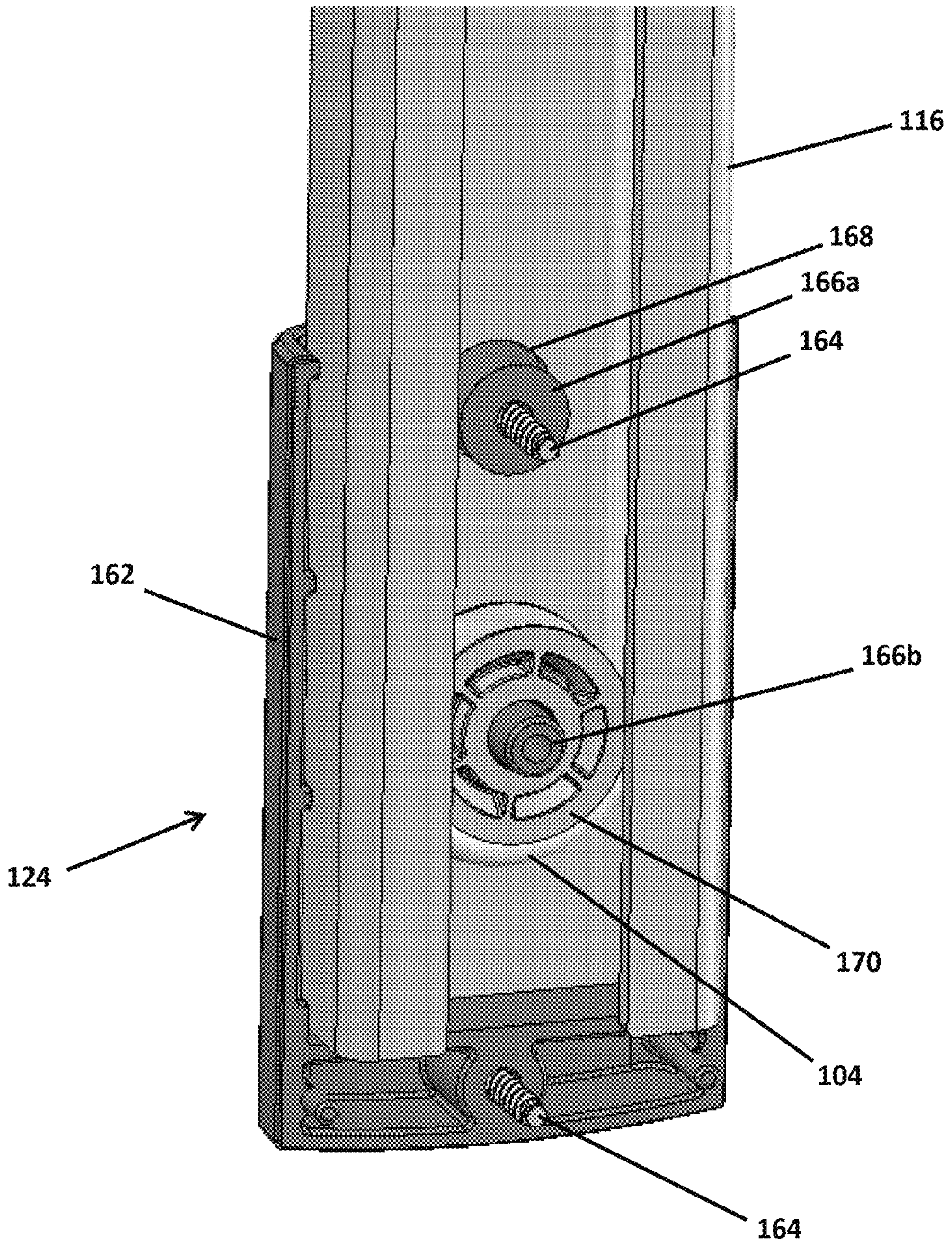
FIG. 8 is an enhanced perspective view of the second end housing of the cord lock actuation assembly of FIG. 2, taken along line 8-8 of FIG. 4 and illustrating the front housing member removed.

With reference to FIG. 8, the second end housing 124 is configured to engage the rail member 116. More specifically, the rear housing member 162 of the second end housing 124 includes at least one projection 166. In the illustrated embodiment, the rear housing member 162 includes a plurality of projections 166*a, b*. Each projection 166 is received by a corresponding aperture 168 defined by the rail member 116, engaging the rear housing member 162 to the rail member 116. A first projection 166*a* is configured to receive the fastener 164. The front housing member 158 (shown in FIG. 2) is then configured to fasten to the rear housing member 162 by the fasteners 164. A second projection 166*b* is configured to carry an idler wheel 170. The idler wheel 170 is configured to rotate relative to the projection 166*b*. The idler wheel 170 engages an end of the continuous looped operator 104. Movement of the continuous looped operator 104 facilitates responsive rotation of the idler wheel 170. Thus, the idler wheel 170 rotates, and assists with guiding, the continuous looped operator 104 during movement of the continuous looped operator 104 relative to the cord lock actuation assembly 100.

Figure 9:
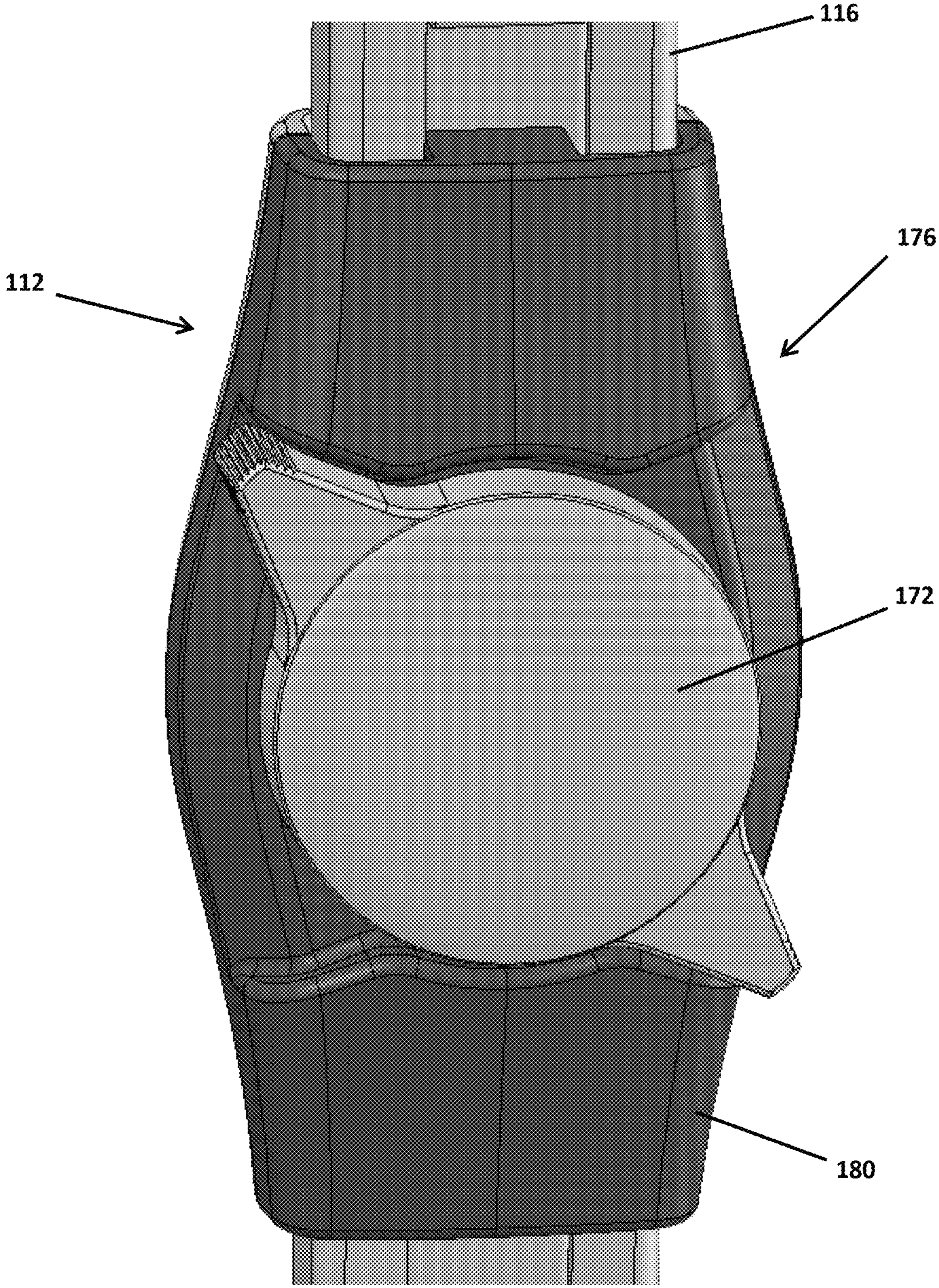
FIG. 9 is an enhanced perspective view of a front side of the slide assembly of the cord lock actuation assembly of FIG. 1.

Referring now to FIGS. 9-17, the slide assembly 112 is illustrated in further detail. With reference to FIG. 9, the slide assembly 112 includes a cam lock member 172 (also referred to as a rotating member 172 or a selector switch 172 or a selector member 172) and an outer housing 176. The outer housing 176 includes a first housing member 180 (or a front housing member 180) and a second housing member 184 (or a rear housing member 184). The first and second housing members 180, 184 are fastened together by a plurality of fasteners 188 (e.g., screws, bolts, etc.) (shown in FIG. 12).

Figure 10:
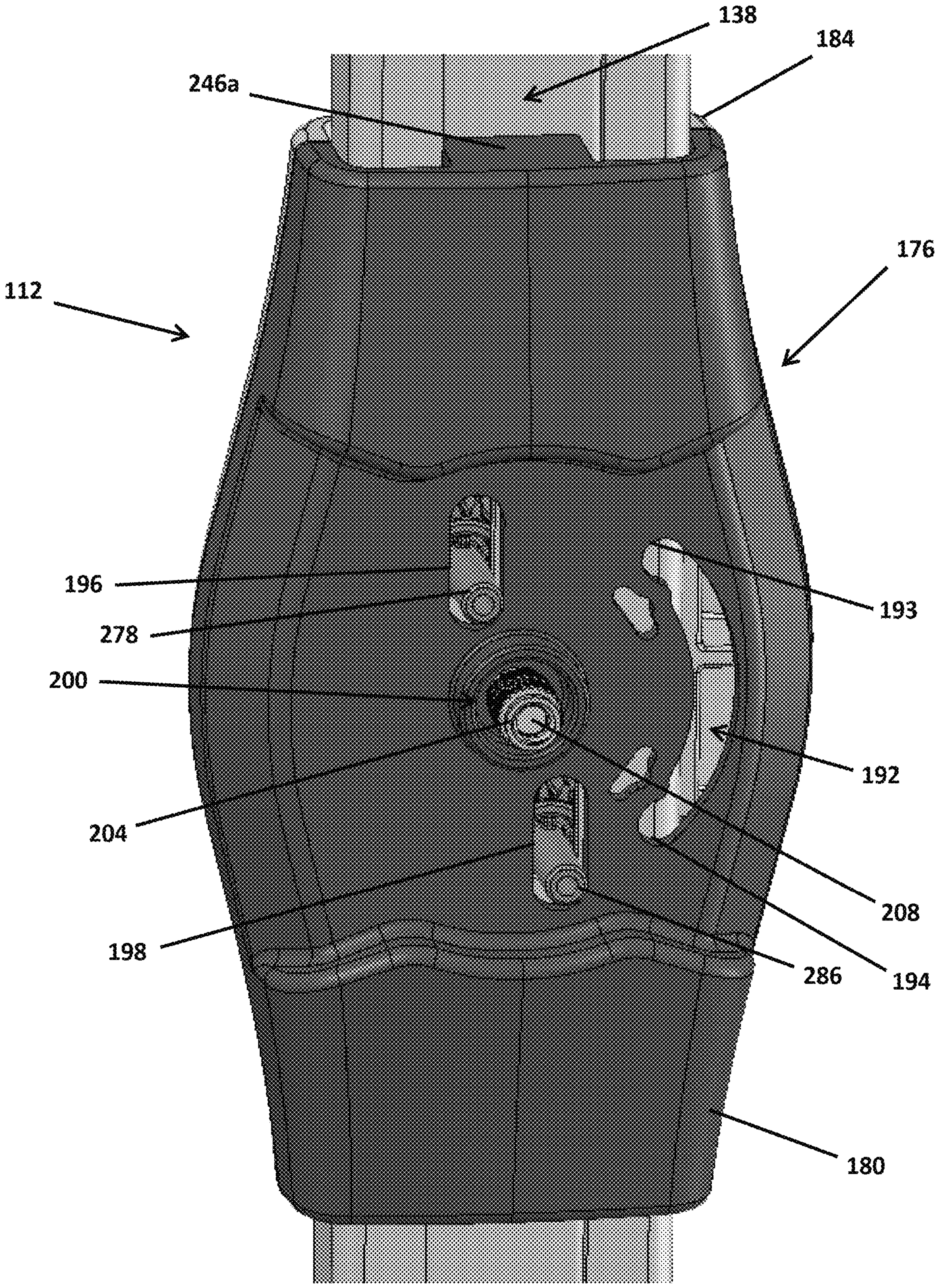
FIG. 10 is a perspective view of the slide assembly of FIG. 9 with a cam lock member removed to illustrate an outer housing.

With reference to FIG. 10, the front housing member 180 of the outer housing 176 defines an arcuate aperture 192. The arcuate aperture 192 (also referred to as an arcuate slot 192) includes a first end 193 opposite a second end 194. The first end 193 is positioned above the second end 194. The front housing member 180 also defines a first elongated aperture 196 and a second elongated aperture 198. The first and second elongated apertures 196, 198 are parallel but offset in two directions. Stated another way, the first elongated aperture 196 is horizontally offset and vertically offset from the second elongated aperture 198. In the illustrated embodiment, the first and second elongated apertures 196, 198 are discorectangle (or stadium) shaped. The first elongated aperture 196 can also be referred to as a first aperture 196 or a first slot 196. The second elongated aperture 198 can also be referred to as a second aperture 198 or a second slot 198.

The front housing member 180 also defines an aperture that receives a rotary bearing assembly 200. The rotary bearing assembly 200 includes a first rotating portion 204 that is carried by a second stationary member 208. The rotating portion 204 is configured to rotate relative to the stationary member 208. For example, the stationary member 208 can define a plurality of threads configured to engage complimentary threads on the rotating portion 204. The rotating portion 204 is also configured to frictionally engage an aperture 212 in the cam lock member 172 (shown in FIG. 11). More specifically, the rotating portion 204 is press fit into the aperture 212 of the cam lock member 172. The stationary member 208 is received by an aperture defined by the front housing member 180 of the outer housing 176. As such, the outer housing 176 carries the stationary member 208. The rotating portion 204 facilitates rotation of the cam lock member 172 relative to the stationary member 208 (and relative to the front housing member 180). Stated another way, the stationary member 208 defines an axis of rotation 214 (shown in FIGS. 17-18) for the cam lock member 172.

Figure 11:
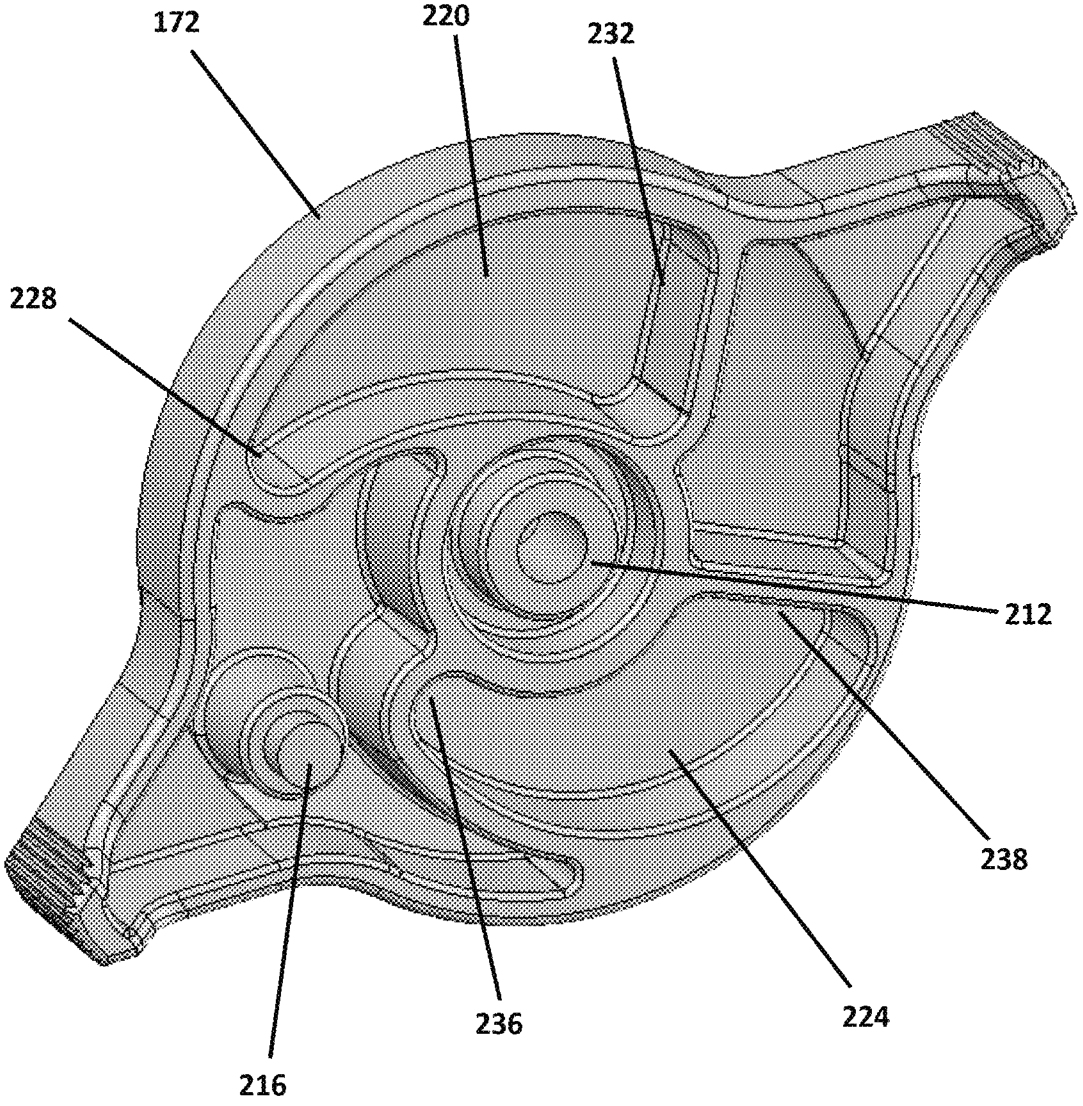
FIG. 11 is a perspective rear view of the cam lock member for use with the slide assembly of FIG. 9.

Referring now to FIG. 11, which illustrates a back side of the cam lock member 172 (or a side that faces the outer housing 176), the cam lock member 172 defines a guide projection 216 (also referred to as a projection 216). The guide projection 216 extends away from the cam lock member 172 in a direction parallel to the axis of rotation (defined by the stationary member 208). The guide projection 216 is configured to be received by the arcuate aperture 192. Accordingly, in response to rotation of the cam lock member 172 relative to the outer housing 176 (or the front housing member 180), the guide projection 216 slides within the arcuate aperture 192. In addition to guiding the guide projection 216, the arcuate aperture 192 is configured to limit a distance of rotation of the cam lock member 172.

The cam lock member 172 also defines a pair of arcuate recesses 220, 224. The arcuate recesses 220, 224 are positioned concentric to the aperture 212. A first arcuate recess 220 includes a narrow end 228 opposite a wide end 230. The narrow end 228 has a narrower cross-sectional width than the wide end 230. Similarly, a second arcuate recess 224 includes a narrow end 236 opposite a wide end 238. The narrow end 236 has a narrower cross-sectional width than the wide end 238. The arcuate recesses 220, 224 are oriented relative to each other such that the narrow ends 228, 236 of each recess 220, 224 are circumferentially adjacent to each other, and the wide ends 232, 238 of each recess 220, 224 are circumferentially adjacent to each other.

Figure 12:
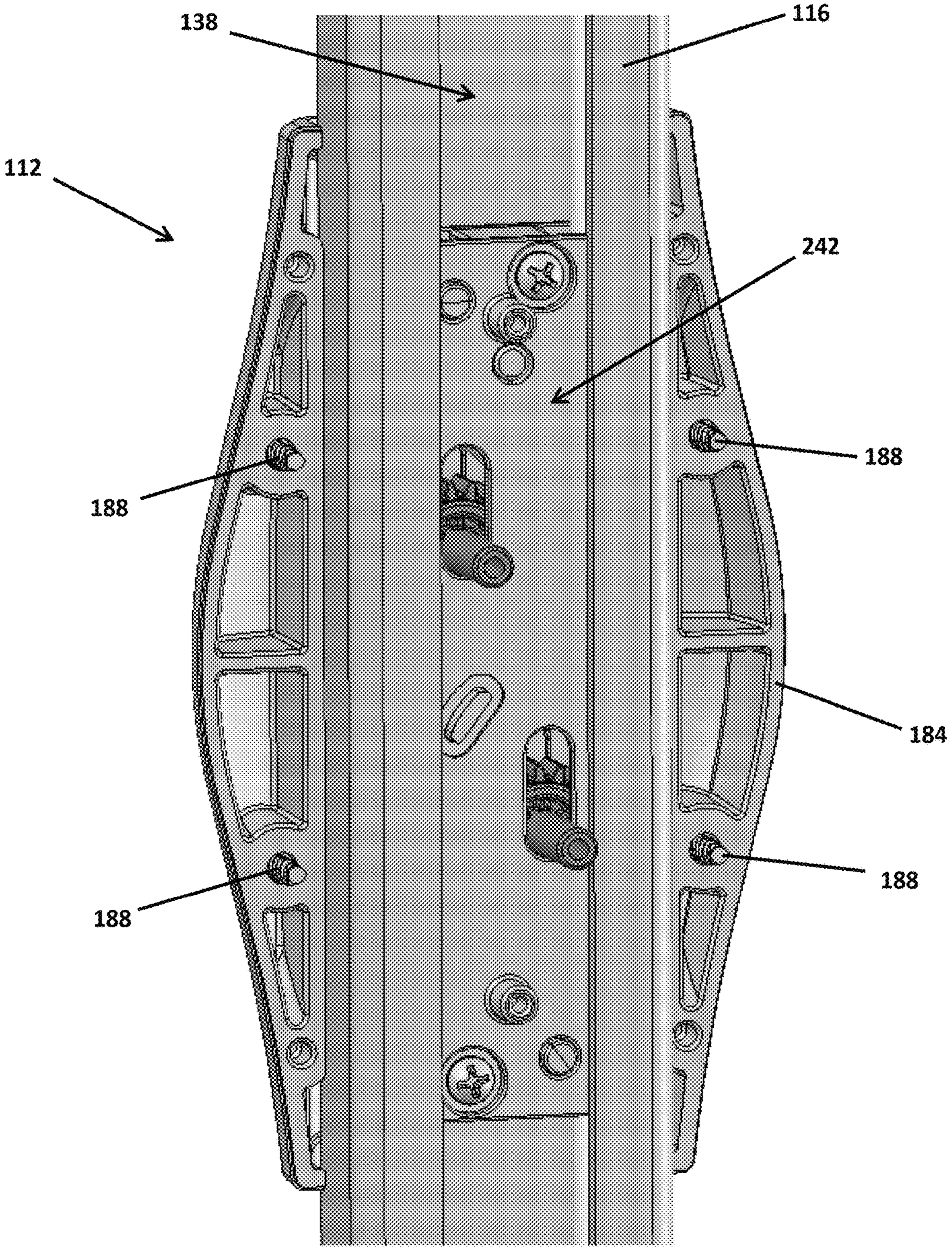
FIG. 12 is a perspective view of the slide assembly of FIG. 10 with a front housing member of the outer housing removed to illustrate an inner housing.
Figure 13:
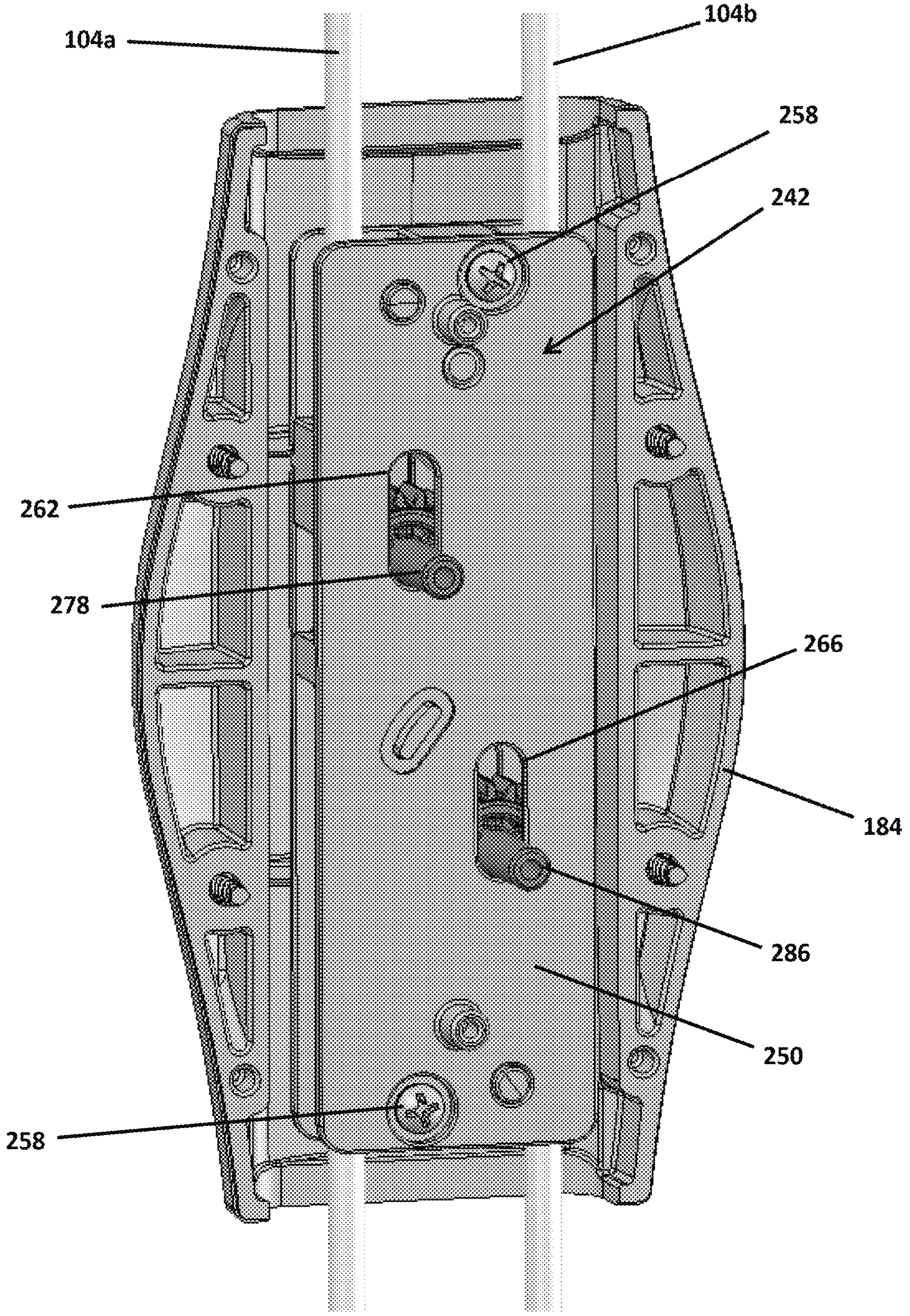
FIG. 13 is a perspective view of the slide assembly of FIG. 12 with the rail member removed.
Figure 14:
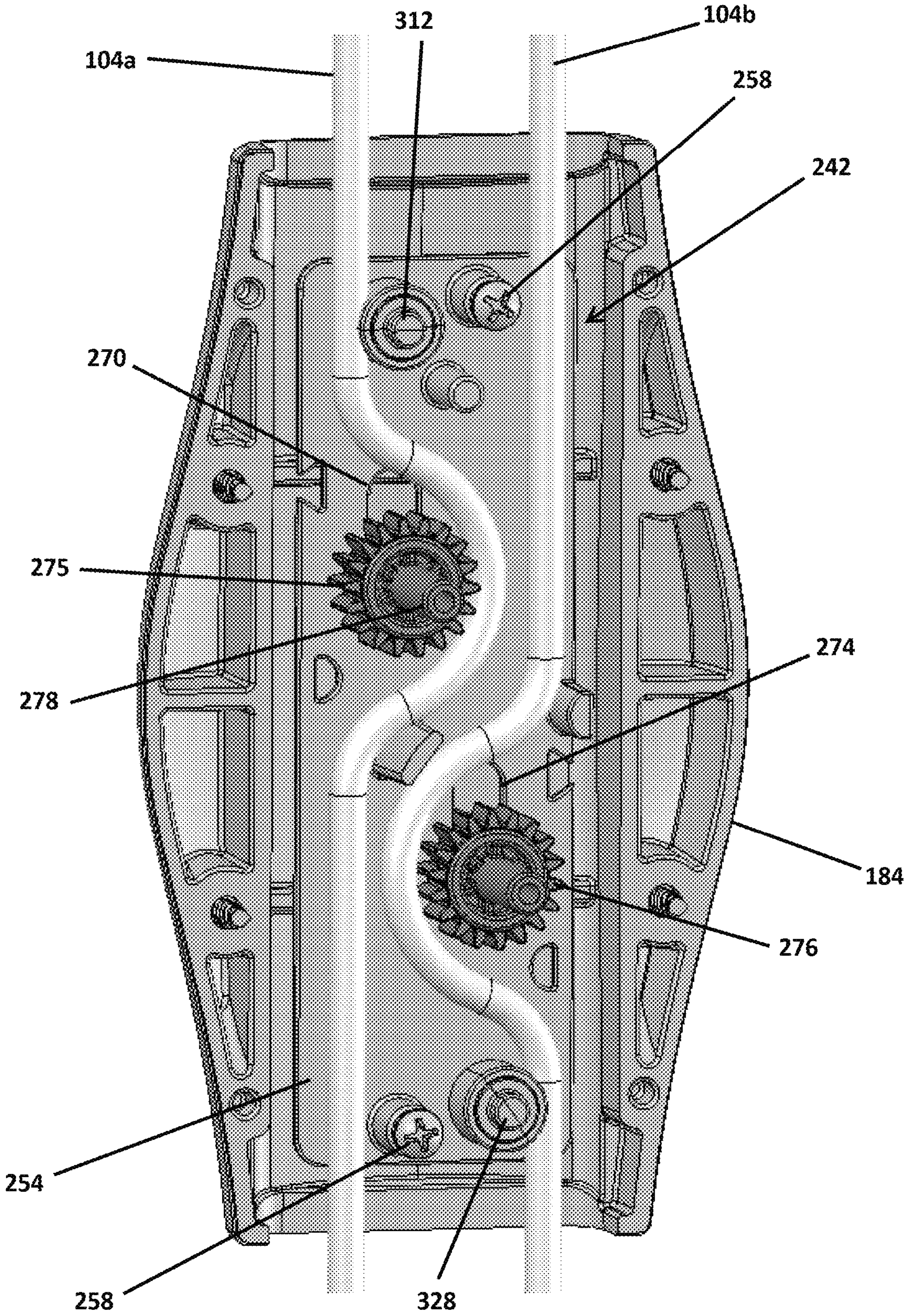
FIG. 14 is a perspective view of the slide assembly of FIG. 13 with a first plate of the inner housing removed.
Figure 15:
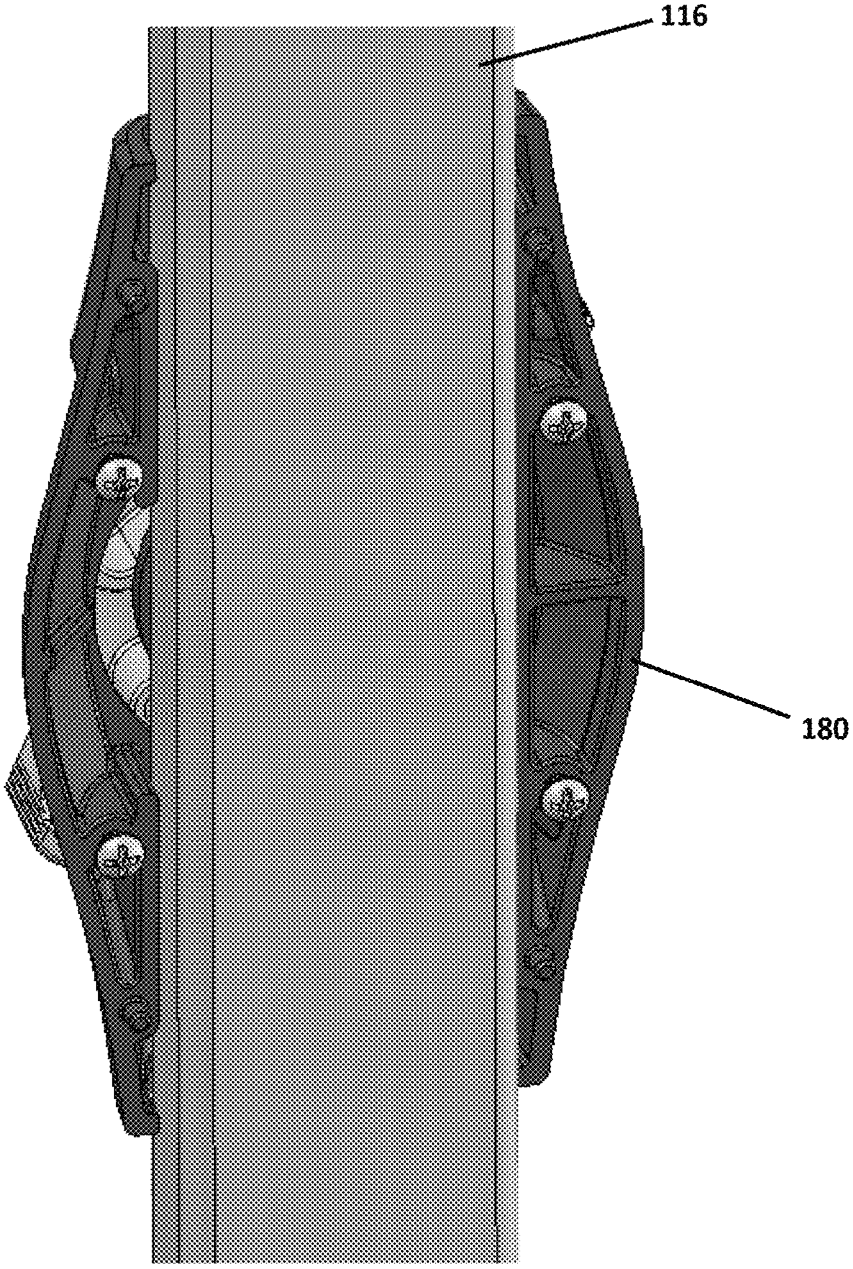
FIG. 15 is an enhanced perspective view of a rear side of the slide assembly of the cord lock actuation assembly of FIG. 2 with a rear housing member of the outer housing removed.
Figure 16:
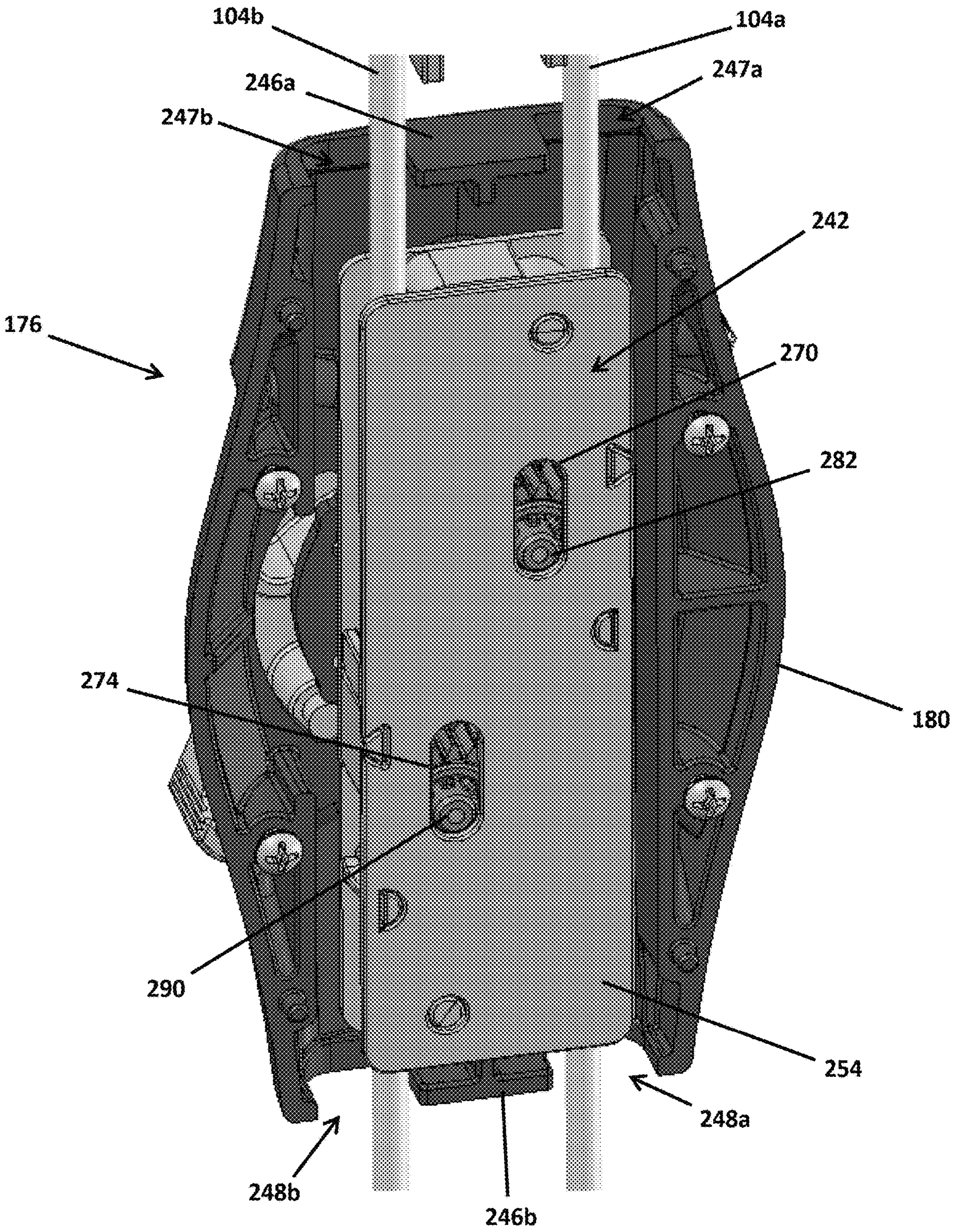
FIG. 16 is a perspective view of the slide assembly of FIG. 15 with the rail member removed to illustrate a rear of the inner housing.
Figure 17:
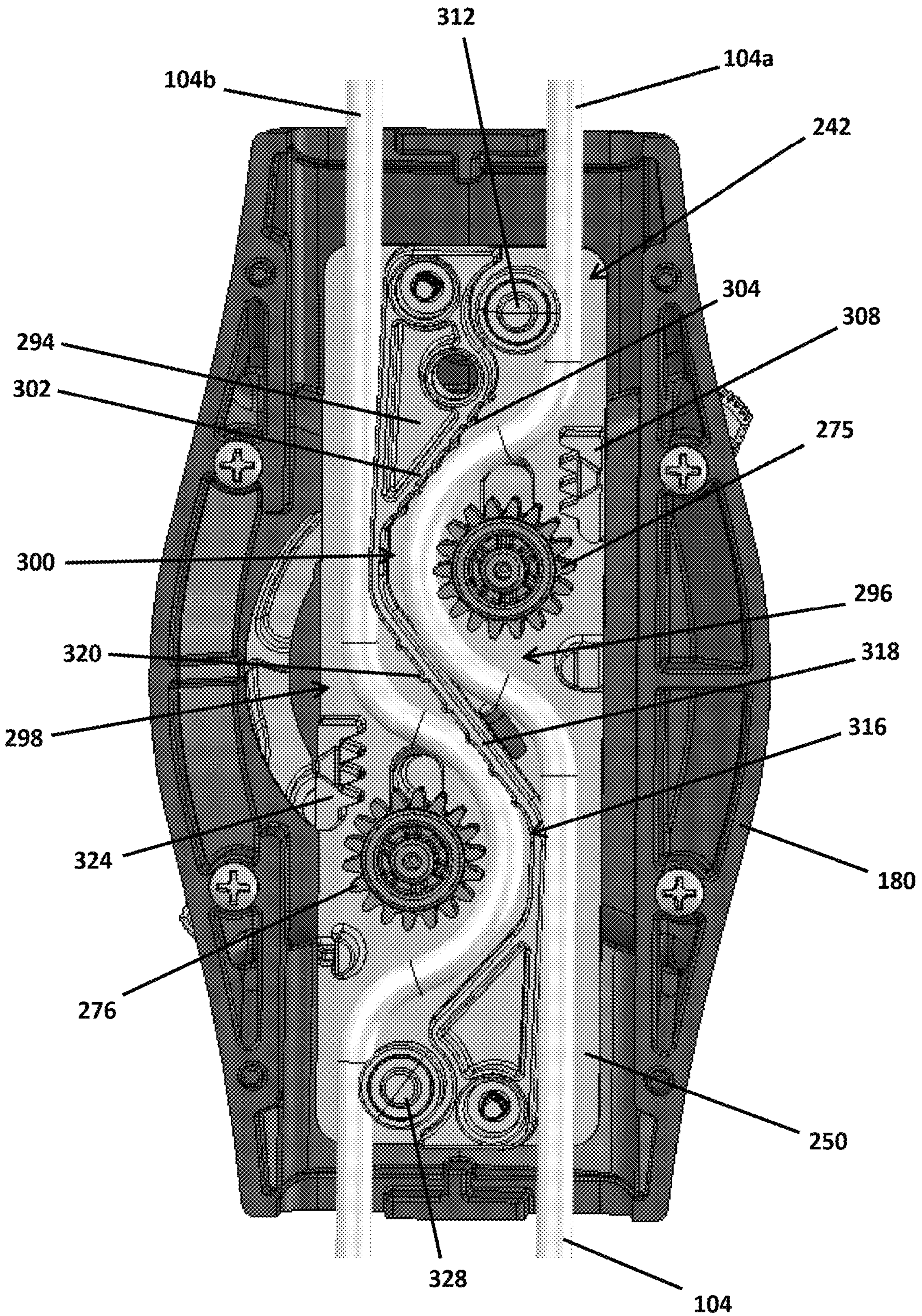
FIG. 17 is a perspective view of the slide assembly of FIG. 16 with a second plate of the inner housing removed.

With reference now to FIGS. 12-17, the slide assembly 112 includes an inner housing 242. FIGS. 12-14 illustrate the inner housing 242 from a side that faces the front housing member 180 (i.e., a front facing side of the inner housing 242). FIGS. 15-17 illustrate the inner housing 242 from a side that faces the rear housing member 184 (i.e., a rear facing side of the inner housing 242). The inner housing 242 is carried by the outer housing 176. As illustrated in FIG. 12, the inner housing 242 is positioned within the rail member 116. Further, the inner housing 242 is configured to slide within the rail member 116. A portion of the inner housing 242 projects out of the rail member 116 through the elongated channel 138. The projecting portion of the inner housing 242 fastens to the front housing member 180. The rear housing member 184, which receives a rear portion of the rail member 116, fastens to the front housing member 180. A shown in FIGS. 10 and 16, the front housing member 180 includes a pair of tabs 246*a*, 246*b* (or arms 246*a*, 246*b*) that are positioned at opposing ends of the front housing member 180. The tabs 246*a*, 246*b* extend into the rail member 116 through the elongated channel 138. The inner housing 242 is positioned between an upper tab 246*a* and a lower tab 246*b*. As shown in FIG. 16, the upper tab 246*a* partially defines a pair of apertures 247*a, b* that respectively guide the first and second sides 104*a*, 104*b* in to and/or out of the outer housing 176 and the inner housing 242. Similarly, the lower tab 246*b* partially defines a pair of apertures 248*a, b* that respectively guide the first and second sides 104*a*, 104*b* in to and/or out of the outer housing 176 and the inner housing 242. It should be appreciated that the inner housing 242 can also be referred to as a slide plate assembly 242. It should also be appreciated that the inner housing 242 is received by the elongated channel 138, and further is configured to slide along the rail member 116 in the elongated channel 138.

The inner housing 242 includes a first plate 250 (or a front plate 250) (shown in FIGS. 13 and 17) and a second plate 254 (or a rear plate 254) (shown in FIGS. 14 and 16). The plates 250, 254 are fastened together by at least one fastener 258 (e.g., a bolt, screw, etc.) (shown in FIG. 13). The rotary bearing assembly 200 is coupled to the front plate 250.

As shown in FIG. 13, the front plate 250 defines a first elongated aperture 262 and a second elongated aperture 266. As shown in FIG. 16, the rear plate 254 also defines a first elongated aperture 270 and a second elongated aperture 274. The first elongated apertures 262, 270 are horizontally aligned with each other. Further, the first elongated apertures 262, 270 of the inner housing 242 are horizontally aligned with the first elongated aperture 196 of the front housing member 180. In addition, the first elongated apertures 262, 270 generally have the same geometry as the first elongated aperture 196 of the front housing member 180. In the illustrated embodiment, the first elongated apertures 262, 270 have a discorectangle (or stadium) shape. The second elongated apertures 266, 274 of the inner housing 242 are also horizontally aligned with each other. The second elongated apertures 266, 274 of the inner housing 242 are also horizontally aligned with the second elongated aperture 198 of the front housing member 180. The second elongated apertures 266, 274 generally have the same geometry as the second elongated aperture 198 of the front housing member 180. In the illustrated embodiment, the second elongated apertures 266, 274 have a discorectangle (or stadium) shape.

With specific reference now to FIGS. 14 and 17, the inner housing 242 carries a plurality of cord engagement members 275, 276 (also referred to as operator engagement members 275, 276 or spur gears 275, 276). A first cord engagement member 275 (or a first engagement member 275) and a second cord engagement member 276 (or a second engagement member 276) are each carried by the slide assembly 112. More specifically, the first and second cord engagement members 275, 276 are carried by the inner housing 242. More specifically, the first and second cord engagement members 275, 276 are positioned between (or sandwiched between) the front and rear plates 250, 254. The first cord engagement member 275 (or first spur gear 275) has a first shaft that extends through the first cord engagement member 275. The first shaft includes a first shaft portion 278 (shown in FIG. 13) and a second shaft portion 282 (shown in FIG. 16). The first and second shaft portions 278, 282 project from opposite sides of the first cord engagement member 275. The first shaft portion 278 is received by the first elongated aperture 262 of the front plate 250 of the inner housing 242 and the first elongated aperture 196 of the front housing member 180 of the outer housing 176 (see FIGS. 10 and 13). After extending through the first elongated apertures 262, 196, the first shaft portion 278 is then received by the first arcuate recess 220 of the cam lock member 172 (see FIG. 11). The second shaft portion 282 is received by the first elongated aperture 270 of the rear plate 254 of the inner housing 242 (see FIG. 16). To facilitate extending through the aligned first elongated apertures 262, 196 of the front plate 250 of the inner housing 242 and the front housing member 180 of the outer housing 176, respectively, and being received by (or in engagement with) the first arcuate recess 220 of the cam lock member 172, the first shaft portion 278 is longer in length than the second shaft portion 282. The first cord engagement member 275 is configured to selectively slide vertically within the aligned first elongated apertures 196, 262, 270. The vertical sliding is guided by the shaft portions 278, 282 sliding within the aligned first elongated apertures 196, 262, 270.

The second cord engagement member 276 (or second spur gear 276) has a second shaft that extends through the second cord engagement member 276. The second shaft includes a first shaft portion 286 (shown in FIG. 13) and a second shaft portion 290 (shown in FIG. 16). The first and second shaft portions 286, 290 project from opposite sides of the second cord engagement member 276. The first shaft portion 286 is received by the second elongated aperture 266 of the front plate 250 of the inner housing 242 and the second elongated aperture 198 of the front housing member 180 of the outer housing 176 (see FIGS. 10 and 13). After extending through the second elongated apertures 266, 198, the first shaft portion 286 is then received by the second arcuate recess 224 of the cam lock member 172 (see FIG. 11). The second shaft portion 290 is received by the second elongated aperture 274 of the rear plate 254 of the inner housing 242 (see FIG. 16). To facilitate extending through the aligned second elongated apertures 266, 198 of the front plate 250 of the inner housing 242 and the front housing member 180 of the outer housing 176, respectively, and being received by (or in engagement with) the second arcuate recess 224 of the cam lock member 172, the first shaft portion 286 is longer in length than the second shaft portion 290. The second cord engagement member 276 is configured to selectively slide vertically within the aligned second elongated apertures 198, 266, 274. The vertical sliding is guided by the shaft portions 286, 290 sliding within the aligned second elongated apertures 198, 266, 274.

With specific reference to FIG. 17, the inner housing 242 includes a wall portion 294 (also referred to as a dividing wall 294 or a wall 294). The wall 294 is carried by the slide assembly 112, and more specifically by the inner housing 242. In the illustrated embodiment, the wall portion 294 is positioned on the front plate 250 of the inner housing 242. The wall portion 294 has a geometry that divides the inner housing 242 into two channels 296, 298. A first side channel 296 is configured to receive the first side 104*a* of the continuous looped operator 104. A second side channel 298 is configured to receive the second side 104*b* of the continuous looped operator 104. Stated another way, the wall 294 is configured to separate the channels 296, 298. In addition, the wall 294 is configured to partially define each channel 296, 298. In the illustrated embodiment, the channels 296, 298 are positioned side-by-side. However, in other examples of embodiments, the channels 296, 298 can be positioned at any suitable position within the slide assembly 112 to facilitate the functionality described herein. In addition, in the illustrated embodiment, each channel 296, 298 defines a curved or tortuous channel or channel shape (also referred to as an arcuate or twisting or serpentine or non-linear channel). In other examples of embodiments, each channel 296, 298 can have any suitable channel shape suitable for facilitating selective engagement (or trapping) of each side 104*a*, 104*b* of the continuous looped operator 104, as discussed further below.

The first side channel 296 includes a first curved portion 300 that is partially defined by the wall portion 294. A first surface 302 is positioned proximate the first cord engagement member 275. More specifically, the first surface 302 is positioned on an opposite side of the first side 104*a* of the continuous looped operator 104 as the first cord engagement member 275. Stated another way, the first side 104*a* of the continuous looped operator 104 extends between the first surface 302 and the first cord engagement member 275. The first cord engagement member 275 is configured to selectively restrict movement of the first side 104*a* of the continuous looped operator 104. More specifically, the first side 104*a* of the continuous looped operator 104 is configured to engage both the first cord engagement member 275 and the first surface 302. Stated another way, the first side 104*a* of the continuous looped operator 104 can be selectively trapped between the first cord engagement member 275 and the first surface 302, allowing the first side 104*a* of the continuous looped operator 104 to travel with the slide assembly 112. As such, the slide assembly 112 is configured to selectively engage the first side 104*a* of the continuous looped operator 104. To assist with selective engagement with the first side 104*a* of the continuous looped operator 104, the first surface 302 can include a plurality of teeth 304 (or serrations 304 or gripping members 304 or projecting members 304). The plurality of teeth 304 can project from the wall portion 294 towards the first side 104*a* of the continuous looped operator 104. In the illustrated embodiment, the first surface 302 is defined by a portion of the wall portion 294. However, in other examples of embodiments, the first surface 302 second surface 318 can be any suitable surface for selective engagement with a portion of the continuous looped operator 104. The first surface 302 can be positioned proximate the first curved portion 300. The first surface 302 can also be referred to as a first looped operator engagement surface 302.

A second wall member 308 can be positioned on the first plate 250. The second wall member 308 defines a plurality of teeth. The wall portion 294 and second wall member 308 partially define opposing sides of the curved portion 300 of the first side channel 296. It should be appreciated that the first cord engagement member 275 is positioned on the second wall member 308 side of the first side 104*a* of the continuous looped operator 104. A first idler wheel 312 can be positioned between the front and rear plates 250, 254 to assist with guiding the first side 104*a* of the continuous looped operator 104 into the curved portion 300 of the first side channel 296.

The second side channel 298 includes a second curved portion 316 that is partially defined by the wall portion 294. A second surface 318 is positioned proximate the second cord engagement member 276. More specifically, the second surface 318 is positioned on an opposite side of the second side 104*b* of the continuous looped operator 104 as the second cord engagement member 276. Stated another way, the second side 104*b* of the continuous looped operator 104 extends between the second surface 318 and the second cord engagement member 276. The second cord engagement member 276 is configured to selectively restrict movement of the second side 104*b* of the continuous looped operator 104. More specifically, the second side 104*b* of the continuous looped operator 104 is configured to engage both the second cord engagement member 276 and the second surface 318. Stated another way, the second side 104*a* of the continuous looped operator 104 can be selectively trapped between the second cord engagement member 276 and the second surface 318, allowing the second side 104*b* of the continuous looped operator 104 to travel with the slide assembly 112. As such, the slide assembly 112 is configured to selectively engage the second side 104*b* of the continuous looped operator 104. To assist with selective engagement with the second side 104*b* of the continuous looped operator 104, the second surface 318 can include a plurality of teeth 320 (or serrations 320 or gripping members 320 or projecting members 320). The plurality of teeth 320 can project from the wall portion 294 towards the second side 104*b* of the continuous looped operator 104. In the illustrated embodiment, the second surface 318 is defined by a portion of the wall portion 294. However, in other examples of embodiments, the second surface 318 can be any suitable surface for selective engagement with a portion of the continuous looped operator 104. In addition, in the illustrated embodiment, the second surface 318 can be positioned proximate the second curved portion 316. In addition, in the illustrated embodiment, the first surface 302 is positioned on a first side of the wall portion 294, while the second surface 318 is positioned on a second, opposite side of the wall portion 294. In addition, the first surface 302 is vertically offset from the second surface 318. In other examples of embodiments, the first surface 302 and the second surface 318 can be positioned at any suitable location or associated with any suitable component, or be incorporated into separate components suitable to selectively engage the associated portion of the continuous looped operator 104 in response to associated movement and engagement by the respective engagement member 275, 276, as discussed herein. The second surface 318 can also be referred to as a second looped operator engagement surface 318.

A third wall member 324 can be positioned on the first plate 250. The third wall member 324 defines a plurality of teeth. The wall portion 294 and third wall member 324 partially define opposing sides of the curved portion 316 of the second side channel 298. It should be appreciated that the second cord engagement member 276 is positioned on the third wall member 324 side of the second side **104*b* of the continuous looped operator 104. A second idler wheel 328 can be positioned between the front and rear plates 250, 254 to assist with guiding the second side 104*b* of the continuous looped operator 104 out of the curved portion 316 of the second side channel 298**.

In operation, the cam lock member 172 is configured to rotate relative to the slide assembly 112, and more specifically the outer housing 176, between a first position and a second position. In response to the selected position of the cam lock member 172, the slide assembly 112 is configured to engage one of the first side **104*a* or the second side 104*b* of the continuous looped operator 104 during sliding movement of the slide assembly 112 relative to the rail member 116. Stated another way, in response to the selected position of the cam lock member 172, the slide assembly 112 will facilitate movement of the continuous looped operator 104 in either a first direction or a second direction that is opposite the first direction. In addition, the slide assembly 112 is configured to engage either the first side 104*a* or the second side 104*b* of the continuous looped operator 104 in response to one direction of sliding movement of the slide assembly 112 relative to the rail member 116. In addition, the slide assembly 112 is configured to engage either the first side 104*a* or the second side 104*b* of the continuous looped operator 104 in response to the same direction of sliding movement of the slide assembly 112 relative to the rail member 116**.

Figure 18:
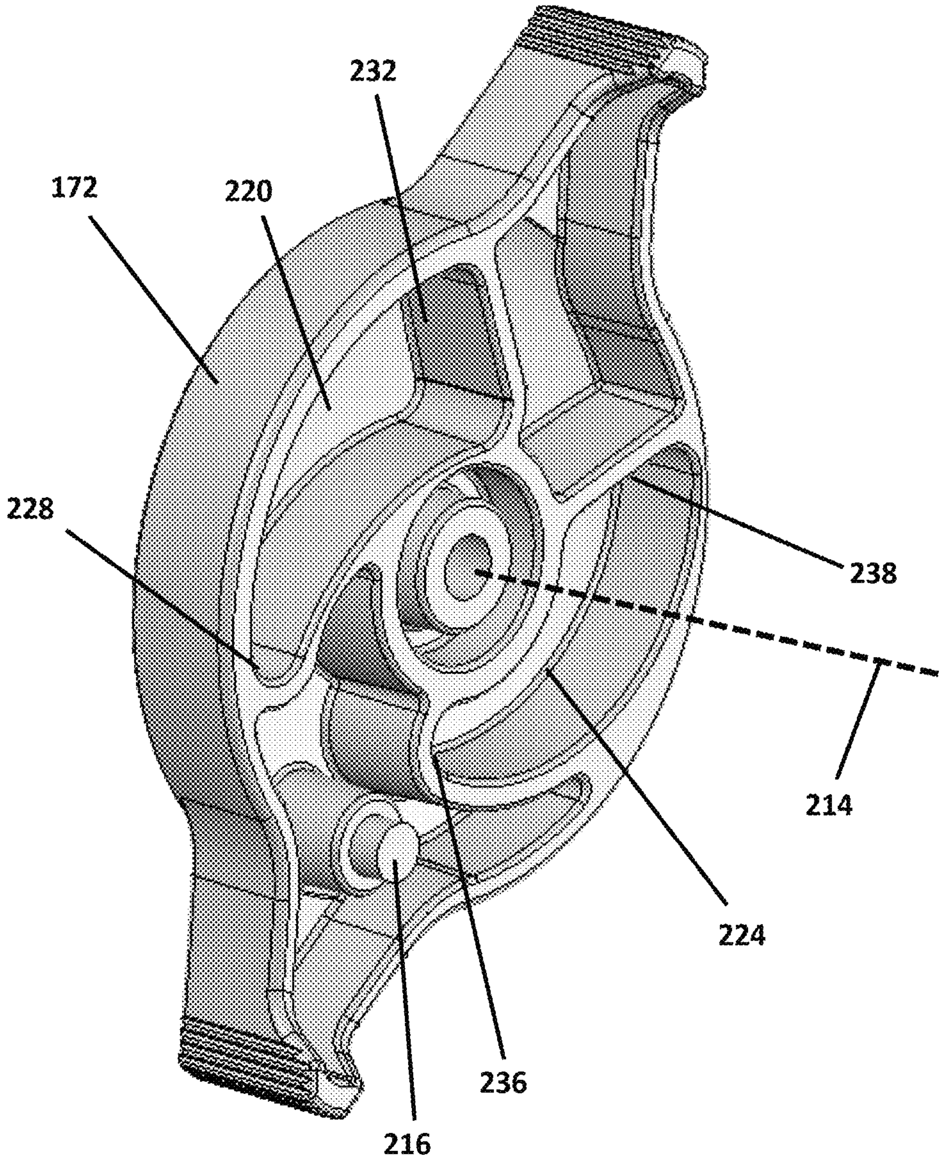
FIG. 18 is a perspective view of a rear side of the cam lock member in a first position.

FIG. 18 illustrates the cam lock member 172 in the first position. In the first position, the cam lock member 172 rotates in a first direction relative to the outer housing 176 along the axis of rotation 214 such that the guide projection 216 slides within the arcuate aperture 192 until contacting the second end 194. In this first position, the first shaft portion 278 of the first cord engagement member 275 is positioned in the wide end 232 of the first arcuate recess 220. The first shaft portion 286 of the second cord engagement member 276 is positioned in the narrow end 236 of the second arcuate recess 224. With the first shaft portion 286 being positioned in the narrow end 236 of the second arcuate recess 224, the second cord engagement member 276 is restricted from sliding movement in the aligned second elongated apertures 198, 266, 274. The second cord engagement member 276 remains locked (or restricted) in a position spaced from both the third wall member 324 and the second side **104*b* of the continuous looped operator 104 (as shown in FIG. 17) during sliding movement of the slide assembly 112 in both a first direction 400 and a second direction 404 opposite the first direction 400 (shown in FIG. 2). Stated another way, the second cord engagement member 276 does not contact the second side 104*b* of the continuous looped operator 104 during sliding movement of the slide assembly 112 relative to the rail member 116 in either the first direction 400 or the second direction 404**.

Unlike the restricted second cord engagement member 276, the first cord engagement member 275 is free to slide within the aligned first elongated apertures 196, 262, 270. More specifically, by being positioned in the wide end 232 of the first arcuate recess 220, the first shaft portion 278 is not restricted from movement. In turn, the first cord engagement member 275 is not restricted from movement. Accordingly, in response to sliding movement of the slide assembly 112 relative to the rail member 116 in the first direction 400 (shown as upwards 400 in the illustrated embodiment), the first cord engagement member 275 slides within the aligned first elongated apertures 196, 262, 270 to a first position (or a lower position). The lower position is a position spaced from both the second wall member 308 and the first side **104*a* of the continuous looped operator 104 (as shown in FIG. 16). However, as the slide assembly 112 transitions to sliding movement relative to the rail member 116 in the second direction 404 (shown as downwards 404 in the illustrated embodiment), the first cord engagement member 275 slides within the aligned first elongated apertures 196, 262, 270 to a second position (or an upper position). In the second upper position, the first cord engagement member 275 engages (or contacts) a first portion of the continuous looped operator 104, and more specifically a portion of the first side 104*a* of the continuous looped operator 104, gripping (or pinching) the first side 104*a* between the first cord engagement member 275 and the plurality of teeth 304 of the wall portion 294. In addition, the spurs (or teeth) of the first cord engagement member 275 engage the teeth of the second wall member 308 to limit rotational movement of the first cord engagement member 275 relative to the first side 104*a* of the continuous looped operator 104. In response to gripping the first side 104*a* of the continuous looped operator 104, sliding movement of the slide assembly 112 relative to the rail member 116 in the second direction 404 results in actuation of the continuous looped operator 104 in a first direction (or a counterclockwise direction relative to the view of the continuous looped operator 104 shown in FIG. 2). More specifically, the first portion of the continuous looped operator 104 travels with the slide assembly 112, such that the first side 104*a* of the continuous looped operator 104 is pulled in the second direction 404. The continuous looped operator 104 slides around the idler wheel 170 and freely through the second side channel 298. Should a single sliding movement of the slide assembly 112 relative to the rail member 116 in the second direction 404 not be sufficient to rotate the continuous looped operator 104 to a desired position of an associated window shade, the process can be repeated. It should be appreciated that movement of the slide assembly 112 relative to the rail member 116 in the first direction 400 results in both cord engagement members 275, 276 being in the first lower position of each associated aligned apertures. Thus, the slide assembly 112 slides along the two sides 104*a*, 104*b* of the continuous looped operator 104 in the first direction 400 without gripping (or pinching) the continuous looped operator 104**.

Figure 19:
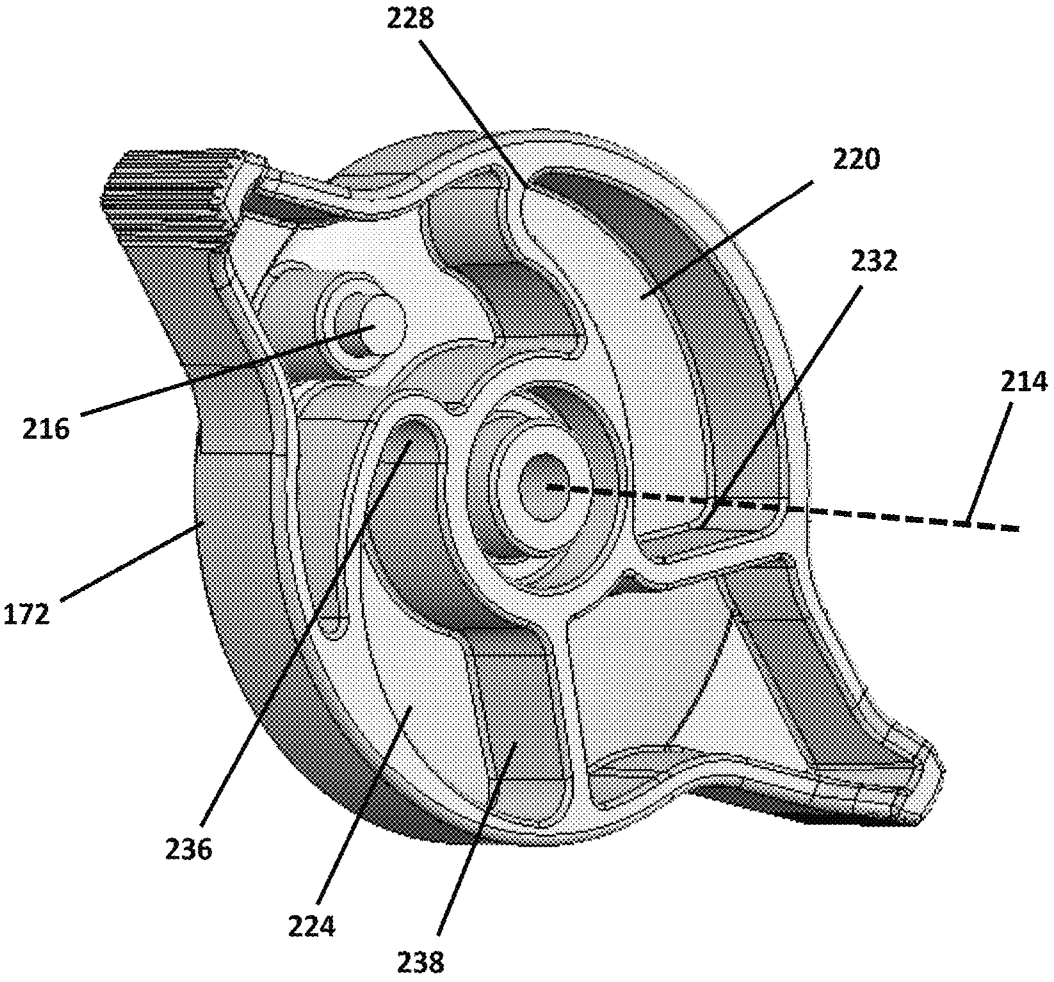
FIG. 19 is a perspective view of a rear side of the cam lock member in a second position.

FIG. 19 illustrates the cam lock member 172 in the second position. In the second position, the cam lock member 172 rotates along the axis of rotation 214 in a second direction relative to the outer housing 176 such that the guide projection 216 slides within the arcuate aperture 192 until contacting the first end 193. In this second position, the first shaft portion 278 of the first cord engagement member 275 is positioned in the narrow end 228 of the first arcuate recess 220. The first shaft portion 286 of the second cord engagement member 276 is positioned in the wide end 238 of the second arcuate recess 224. With the first shaft portion 278 being positioned in the narrow end 228 of the first arcuate recess 220, the first cord engagement member 275 is restricted from sliding movement in the aligned first elongated apertures 196, 262, 270. The first cord engagement member 275 remains locked (or restricted) in a position spaced from both the second wall member 308 and the first side 104*a* of the continuous looped operator 104 (as shown in FIG. 17) during sliding movement of the slide assembly 112 in both the first direction 400 and the second direction 404 (shown in FIG. 2). Stated another way, the first cord engagement member 275 does not contact the first side 104*a* of the continuous looped operator 104 during sliding movement of the slide assembly 112 relative to the rail member 116 in either the first direction 400 or the second direction 404.

Unlike the restricted first cord engagement member 275, the second cord engagement member 276 is free to slide within the aligned second elongated apertures 198, 266, 274. More specifically, by being position in the wide end 238 of the second arcuate recess 224, the first shaft portion 286 is not restricted from movement. In turn, the second cord engagement member 276 is not restricted from movement. Accordingly, in response to sliding movement of the slide assembly 112 relative to the rail member 116 in the first direction 400 (shown as upwards 400 in the illustrated embodiment), the second cord engagement member 276 slides within the aligned second elongated apertures 198, 266, 274 to a first position (or a lower position). The lower position is a position spaced from both the third wall member 324 and the second side 104*b* of the continuous looped operator 104 (as shown in FIG. 17). However, as the slide assembly 112 transitions to sliding movement relative to the rail member 116 in the second direction 404 (shown as downwards 404 in the illustrated embodiment), the second cord engagement member 276 slides within the aligned second elongated apertures 198, 266, 274 to a second position (or an upper position). In the second upper position, the second cord engagement member 276 engages a second portion of the continuous looped operator 104, and more specifically the second side 104*b* of the continuous looped operator 104, gripping (or pinching) the second side 104*b* between the second cord engagement member 276 and the plurality of teeth 320 of the wall portion 294. In addition, the spurs (or teeth) of the second cord engagement member 276 engage the teeth of the third wall member 324 to limit rotational movement of the second cord engagement member 276 relative to the second side 104*b* of the continuous looped operator 104. In response to gripping the second side 104*b* of the continuous looped operator 104, sliding movement of the slide assembly 112 relative to the rail member 116 in the second direction 404 results in actuation of the continuous looped operator 104 in a second direction (or a clockwise direction relative to the view of the continuous looped operator 104 shown in FIG. 2). More specifically, the second portion of the continuous looped operator 104 travels with the slide assembly 112, such that the second side 104*b* of the continuous looped operator 104 is pulled in the second direction 404. The continuous looped operator 104 slides around the idler wheel 170 and freely through the first side channel 296. Should a single sliding movement of the slide assembly 112 relative to the rail member 116 in the second direction 404 not be sufficient to rotate the continuous looped operator 104 to a desired position of an associated window shade, the process can be repeated. It should be appreciated that movement of the slide assembly 112 relative to the rail member 116 in the first direction 400 results in both cord engagement members 275, 276 being in the first lower position of each of the associated aligned apertures. Thus, the slide assembly 112 slides along the two sides 104*a*, 104*b* of the continuous looped operator 104 in the first direction 400 without gripping (or pinching) the continuous looped operator 104.

It should be appreciated that sliding movement of the slide assembly 112 relative to the rail member 116 in the first direction 400 results in both cord engagement members 275, 276 being in the first lower position of each associated aligned apertures. Thus, the slide assembly 112 slides along the two sides 104*a*, 104*b* of the continuous looped operator 104 without gripping (or pinching) the continuous looped operator 104. Gripping (or pinching) of the continuous looped operator 104 only occurs in response to sliding movement of the slide assembly 112 in the second direction 404 and based on the selected position of the cam lock member 172. Stated another way, the continuous looped operator 104 is rotated in either the first direction or second direction (i.e., either the clockwise or the counterclockwise movement of the continuous looped operator 104 relative to the view of the continuous looped operator 104 shown in FIG. 2) in response to sliding movement of the slide assembly 112 relative to the rail member 116 in the same second direction 404.

The cord lock actuation assembly 100 advantageously provides for operation of the continuous looped operator 104 while minimizing exposure of the continuous looped operator 104, reducing a risk of injury from entanglement or unintended strangulation by a pet or child. The majority of the continuous looped operator 104 is contained within the rail member 116. The cord lock actuation assembly 100 further provides for simple operation, as the direction of movement of the continuous looped operator 104 is selected by rotation of the cam lock member 172, followed by sliding movement of the slide assembly 112 relative to the rail member 116. Further, the slide assembly 112 is designed to not engage the continuous looped operator 104 when the slide assembly 112 slides relative to the rail member 116 in the first direction 400. The slide assembly 112 only engages one of the sides 104*a*, 104*b* of the continuous looped operator 104 in response to sliding the slide assembly 112 relative to the rail member 116 in the second direction 404. These and other advantages are realized by the disclosure provided herein.

What is claimed is:

1. An actuation assembly for a continuous looped operator comprising:

a slide assembly configured to laterally slide in a first direction and a second direction opposite the first direction;

a first cord engagement member carried by the slide assembly;

a second cord engagement member carried by the slide assembly; and a selector switch rotatably connected to the slide assembly, the selector switch receives a portion of the first cord engagement member and a portion of the second cord engagement member, the selector switch configured to rotate move-relative to the slide assembly between a first position and a second position, wherein in response to the selector switch being moved to the first position and in response to the slide assembly laterally sliding in the first direction, the first cord engagement member is restricted from moving relative to the slide assembly and the second cord engagement member moves relative to the slide assembly to a first position, and wherein in response to the selector switch being moved to the first position and in response to the slide assembly laterally sliding in the second direction, the first cord engagement member is restricted from moving relative to the slide assembly and the second cord engagement member moves relative to the slide assembly to a second position to engage a first portion of the continuous looped operator such that the first portion of the continuous looper operator travels with the slide assembly in the second direction.

2. The actuation assembly of claim 1, wherein in response to the selector switch being moved to the second position and in response to the slide assembly laterally sliding in the first direction, the second cord engagement member is restricted from moving relative to the slide assembly and the first cord engagement member moves relative to the slide assembly to a first position, and wherein in response to the selector switch being moved to the second position and in response to the slide assembly laterally sliding in the second direction, the second cord engagement member is restricted from moving relative to the slide assembly and the first cord engagement member moves relative to the slide assembly to a second position to engage a second portion of the continuous looped operator such that the second portion of the continuous looper operator travels with the slide assembly in the second direction.

3. The actuation assembly of claim 2, wherein the first portion of the continuous looped operator is a first side of the continuous looped operator, and the second portion of the continuous looped operator is a second side of the continuous looped operator.

4. The actuation assembly of claim 2, wherein the selector switch defines a first recess and a second recess, the first recess includes a first narrow end and a first wide end, and the second recess includes a second narrow end and a second wide end, wherein the portion of the first cord engagement member is received by the first recess, and the portion of the second cord engagement member is received by the second recess, wherein in response to the selector switch being moved to the first position, the portion of the first cord engagement member is positioned in the first narrow end of the first recess, and the portion of the second cord engagement member is positioned in the second wide end of the second recess, and wherein in response to the selector switch being moved to the second position, the portion of the first cord engagement member is positioned in the first wide end of the first recess, and the portion of the second cord engagement member is positioned in the second narrow end of the second recess.

5. The actuation assembly of claim 1, wherein the slide assembly includes an inner housing.

6. The actuation assembly of claim 5, wherein the first cord engagement member is configured to selectively slide relative to the inner housing, and the second cord engagement member is configured to selectively slide relative to the inner housing.

7. The actuation assembly of claim 6, wherein the inner housing defines a first elongated aperture and a second elongated aperture, a portion of the first cord engagement member is received by the first elongated aperture and a portion of the second cord engagement member is received by the second elongated aperture.

8. The actuation assembly of claim 7, wherein the first elongated aperture is offset from the second elongated aperture.

9. The actuation assembly of claim 7, wherein the portion of the first cord engagement member is configured to selectively slide relative to the inner housing within the first elongated aperture, and the second cord engagement member is configured to selectively slide relative to the inner housing within the second elongated aperture.

10. The actuation assembly of claim 1, wherein the slide assembly defines an arcuate aperture, and the selector switch defines a projection, the projection slides within the arcuate aperture in response to the selector switch moving between the first position and the second position.

11. The actuation assembly of claim 1, wherein the selector switch defines a first recess and a second recess, the first recess includes a first narrow end and a first wide end, and the second recess includes a second narrow end and a second wide end, wherein the portion of the first cord engagement member is received by the first recess, and the portion of the second cord engagement member is received by the second recess.

12. The actuation assembly of claim 11, wherein in response to the selector switch being moved to the first position, the portion of the first cord engagement member is positioned in the first narrow end of the first recess, and the portion of the second cord engagement member is positioned in the second wide end of the second recess.

13. The actuation assembly of claim 12, wherein the first recess defines an arcuate recess, and wherein the second recess defines an arcuate recess.

14. The actuation assembly of claim 12, wherein the portion of the first cord engagement member is a first shaft, and the portion of the second cord engagement member is a second shaft.

15. The actuation assembly of claim 1, further comprising a rail assembly defining a first channel, a second channel, and a third channel, a first side of the continuous looped operator is received by the first channel, and a second side of the continuous looped operator is received by the second channel.

16. The actuation assembly of claim 15, wherein the slide assembly includes an inner housing, the inner housing is received by the third channel and is configured to slide relative to the rail assembly.

17. The actuation assembly of claim 16, wherein the inner housing includes a first looped operator engagement surface and a second looped operator engagement surface, the first side of the continuous looped operator extends between the first looped operator engagement surface and the first cord engagement member, and the second side of the continuous looped operator extends between the second looped operator engagement surface and the second cord engagement member.

18. The actuation assembly of claim 17, wherein the inner housing includes a wall configured to separate a first side channel within the inner housing from a second side channel within the inner housing, the first side of the continuous looped operator extends through the first side channel of the inner housing, and the second side of the continuous looped operator extends through the second side channel of the inner housing.

19. The actuation assembly of claim 18, wherein the wall defines the first looped operator engagement surface and the second looped operator engagement surface, and wherein in response to the selector switch being moved to the first position and in response to the slide assembly laterally sliding in the second direction, the second cord engagement member moves relative to the slide assembly to a second position to engage the first portion of the continuous looped operator, trapping the first portion of the continuous looped operator between the second cord engagement member and the second looped operator engagement surface.

20. An actuation assembly for a continuous looped operator comprising:

a slide assembly configured to laterally slide in a first direction and a second direction opposite the first direction;

a first cord engagement member carried by the slide assembly;

a second cord engagement member carried by the slide assembly; and a selector switch rotatably connected to the slide assembly, the selector switch configured to rotate relative to the slide assembly between a first position and a second position, wherein in response to the selector switch being in the first position and the slide assembly moving in the first direction, the first cord engagement member is restricted from moving relative to the slide assembly and the second cord engagement member moves relative to the slide assembly out of engagement with the continuous looped operator, and wherein in response to the selector switch being in the first position and the slide assembly moving in the second direction, the first cord engagement member is restricted from moving relative to the slide assembly and the second cord engagement member moves relative to the slide assembly into engagement with the continuous looped operator.

21. The actuation assembly of claim 20, wherein the slide assembly includes an inner housing.

22. The actuation assembly of claim 21, wherein the first cord engagement member is configured to selectively slide relative to the inner housing, and the second cord engagement member is configured to selectively slide relative to the inner housing.

23. The actuation assembly of claim 22, wherein the inner housing defines a first elongated aperture and a second elongated aperture, a portion of the first cord engagement member is received by the first elongated aperture and a portion of the second cord engagement member is received by the second elongated aperture.

24. The actuation assembly of claim 23, wherein the first elongated aperture is offset from the second elongated aperture.

25. The actuation assembly of claim 23, wherein the portion of the first cord engagement member is configured to selectively slide relative to the inner housing within the first elongated aperture, and the second cord engagement member is configured to selectively slide relative to the inner housing within the second elongated aperture.

26. The actuation assembly of claim 20, wherein the selector switch defines a first recess and a second recess, the first recess includes a first narrow end and a first wide end, and the second recess includes a second narrow end and a second wide end, wherein the portion of the first cord engagement member is received by the first recess, and the portion of the second cord engagement member is received by the second recess.

27. The actuation assembly of claim 26, wherein in response to the selector switch being moved to the first position, the portion of the first cord engagement member is positioned in the first narrow end of the first recess, and the portion of the second cord engagement member is positioned in the second wide end of the second recess.

28. The actuation assembly of claim 27, wherein the first recess defines an arcuate recess, and wherein the second recess defines an arcuate recess.

29. The actuation assembly of claim 27, wherein the portion of the first cord engagement member is a first shaft, and the portion of the second cord engagement member is a second shaft.

* * * * *